United States Patent [19]

Syswerda

[11] Patent Number: 5,319,781
[45] Date of Patent: Jun. 7, 1994

[54] GENERATION OF SCHEDULES USING A GENETIC PROCEDURE

[75] Inventor: Gilbert P. Syswerda, Winchester, Mass.

[73] Assignee: Bolt Beranek and Newman Inc., Cambridge, Mass.

[21] Appl. No.: 695,311

[22] Filed: May 3, 1991

[51] Int. Cl.⁵ .................. G06F 15/00; G06F 9/00
[52] U.S. Cl. .................... 395/650; 364/DIG. 1; 364/281.8; 364/281.3
[58] Field of Search ............... 395/650; 364/DIG. 1, 364/281.3, 281.8

[56] References Cited

U.S. PATENT DOCUMENTS 5,148,513  9/1992  Koza et al. ..................... 395/13

OTHER PUBLICATIONS

"A Genetic Algorithm for job shop", Falkenauer, E., and Bouffouix, S., Proc. of 1991 IEEE Int. Conf. on Robotics & Aut. Sacramento, Calif. Apr. 1991, pp. 824–829.
"Efficient Multiprocessor Scheduling Based on Genetic Algorithms", Hou, E. S., Hong, R. and Ansari, N. pp. 1239–1243.

*Primary Examiner*—Gareth D. Shaw
*Assistant Examiner*—A. Katbab
*Attorney, Agent, or Firm*—Henry D. Pahl, Jr.

[57] ABSTRACT

In the scheduling method disclosed herein, a genetic algorithm is employed to improve a population of possible schedules represented by respective chromosomes, where the chromosomes upon which the genetic algorithm operates are not a direct encoding of a possible schedules. Rather, the details of the scheduling problem and the real life constraints typically associated with such problems are hidden from the genetic algorithm by the use of a deterministic schedule builder which operates on lists of the desired tasks and which generates legal schedules, i.e. schedules which do not violate hard constraints. The legal schedules so generated are evaluated or scored and the scores are provided to the genetic algorithm as feedback for influencing subsequent operation of the genetic algorithm.

14 Claims, 5 Drawing Sheets

RESOURCES

RESOURCES

```
Parent 1:            a b c d e f g h i j
Parent 2:            e i b d f a j g c h
Selected positions:      *  *  *     *
Child 1:             a i b c f d e g h j
Child 2:             i b c d e f a h j g
```

```
Parent 1:            a b c d e f g h i j
Parent 2:            e i b d f a j g c h
Selected positions:      *  *  *     *
Child 1:             a i c d e b f h g j
Child 2:             b i c d f a j g e h
```

Parent     a b c d e f g h i j

Child     a b c h e f g d i j

GENERATION OF SCHEDULES USING A GENETIC PROCEDURE

BACKGROUND OF THE INVENTION

The present invention relates to a method of scheduling and more particularly to a method of scheduling tasks which employs a genetic algorithm for progressively improving possible solutions to a scheduling problem.

As is understood by those skilled in the art, scheduling and planning are difficult problems which do not easily yield to automated solving. They are problems which are typically tackled with a combination of search techniques and heuristics. Scheduling is difficult for various reasons. It is a computationally complex problem described in computer science terms as NP complete. This means that search techniques that deterministically and exhaustively search the space of possibilities will probably fail because of time requirements. On the other hand, search techniques that use heuristics to prune the search space will not be guaranteed to find an optimal solution or even a good one. Further, scheduling problems are often complicated by the details of a particular scheduling task. Algorithmic consideration of the specific constraints must often be embodied in what amounts to a domain specific expert system. Thus, any given such system has limited applicability. How the expert knowledge is embedded into an optimization algorithm is often very algorithm specific.

It has previously been proposed to apply genetic algorithms to scheduling problems. As is understood by those skilled in the art, genetic algorithms function by applying operators, e.g. crossover and mutation, to a population of possible solutions often referred to in the art as "chromosomes". Traditionally, chromosomes are simple binary vectors. This simple representation has substantial appeal and the theoretical grounding of genetic algorithms is based on the binary vectors and simple operators. However, many problems emerge when one attempts to represent complicated problems using binary vectors. The success of genetic algorithms in finding good solutions is in general rather directly a function of the manner in which the chromosomes are encoded to represent possible solutions. The situation is further complicated in scheduling problems in that the usual methods of applying crossover and mutation may generate illegal solutions and the genetic algorithm will then in effect spend substantial effort in exploring unhelpful search space. Encoding methods attempting to avoid these problems are described in Davis, L. (1985). *Job shop scheduling with genetic algorithms*. Proceedings of an International Conference on Genetic Algorithms and Their Applications. Hillsdale, N.J.: Lawrence Erlbaum Associates. and Whitley, D., T. Starkweather, and D. Fuquay (1989). *Scheduling problems and the traveling salesman: the genetic edge recombination operator*. Proceedings of the Third International Conference on Genetic Algorithms and Their Applications. San Mateo, Calif.: Morgan Kaufmann.

Among the several objects of the present invention may be noted the provision of a novel method for creating schedules; the provision of such a method which will effectively schedule tasks, each of which requires selected resources from a predetermined pool of resources for respective time intervals; the provision of such a method which will schedule tasks having associated therewith various constraints, some of which may be hard or rigid and others of which may be more in the nature of preferences; the provision of such a method which will consistently generate good solutions to complex scheduling problems; the provision of such a method which is easily adaptable to a variety of scheduling problems; the provision of such a method which is adapted to automated or computerized implementation; the provision of such a method which operates quickly; and the provision of such a method which is highly reliable and which may be implemented relatively inexpensively. Other objects and features will be in part apparent and in part pointed out hereinafter.

In accordance with the practice of the present invention, a genetic algorithm is employed which utilizes chromosomes which are not simple binary vectors but, rather, are more indirect representations of possible solutions, for example, merely ordered lists of tasks to be performed. Further, the genetic algorithm is insulated from domain specific knowledge by the inclusion, in the overall system, of a deterministic schedule builder. The schedule builder operates to place the tasks in a given list into a legal schedule, i.e. a schedule which complies with the various hard constraints which may be associated with each task. Legal schedules generated in this manner are then evaluated or scored on the basis of the various soft or preferential constraints to determine how good the putative schedule is. The scores of possible solutions are provided as feedback to the genetic algorithm for use in controlling the operators which effect evolution of the population of solutions.

In a preferred embodiment, the method of the present invention operates to schedule tasks, each of which requires selected resources from a predetermined pool of resources for respective time intervals, each task having associated constraints and an associated scoring function for evaluating its inclusion within a schedule. An initial population of sequential task lists is generated, preferably randomly. The successive tasks in each list are sequentially fit into a respective legal schedule, observing the associated constraints. Each possible schedule in the population is evaluated in accordance with the scoring function to obtain a ranking of the respective lists. Pairs of higher ranking lists are stochastically selected for combination to generate new member lists to be added to the population and lower ranked lists are stochastically deleted from the population. Preferably, mutation is periodically applied by stochastically selecting a pair of tasks in one of the task lists and reversing the positions of the pair in that list.

BRIEF DESCRIPTION OF THE DRAWINGS

FIG. 1A is a matrix illustrating an exemplary set of tasks to be scheduled;

FIG. 1B is a partially constructed schedule placing some of the tasks of FIG. 1A into a possible schedule;

Corresponding reference characters indicate corresponding parts throughout the several views of the drawings.

DESCRIPTION OF THE PREFERRED EMBODIMENTS

Figures 1A, 1B:
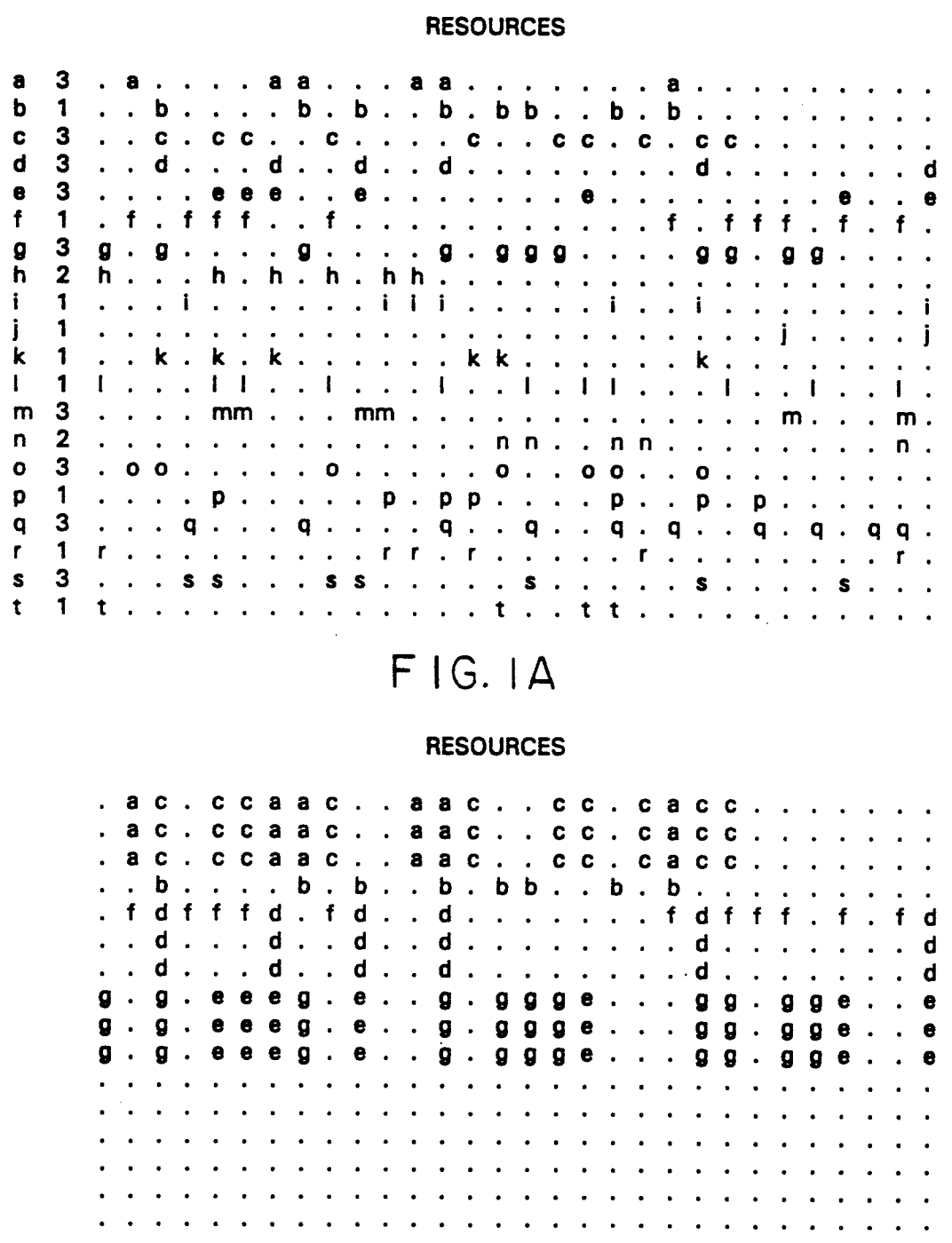

The complex nature of the scheduling problem may be illustrated by the simplified example illustrated in FIGS. 1A and 1B. FIG. 1A illustrates a set of tasks labeled a-t down the left side of the matrix together with the number of hours over which various resources will be required. Thirty different resources are indicated by different positions along the horizontal axis of the matrix of FIG. 1A. There is only a single instance of each resource so a conflict for any resource will be a violation of a hard constraint. Other examples of hard constraints may be that no task can be scheduled after certain times of the day. Likewise, particular users may not be available at particular times or may prefer a particular time. There may in some situations also be constraints of precedence, i.e. certain tasks cannot be performed until other tasks have been completed.

FIG. 1B is a partially constructed schedule with the tasks a-g placed into the schedule on a simple first-come, first-serve basis but observing the hard constraint of avoiding conflict in the use of a resource. A schedule builder which functions in this way is deterministic in that the schedule which results is determined by the order in which the tasks occur in the list. More complex schedule builders may also be implemented which utilize more domain specific knowledge, such as soft constraints, but which are still deterministic in the sense that the resulting schedule is determined by the order in which the tasks are considered.

Figures 2, 3, 4:
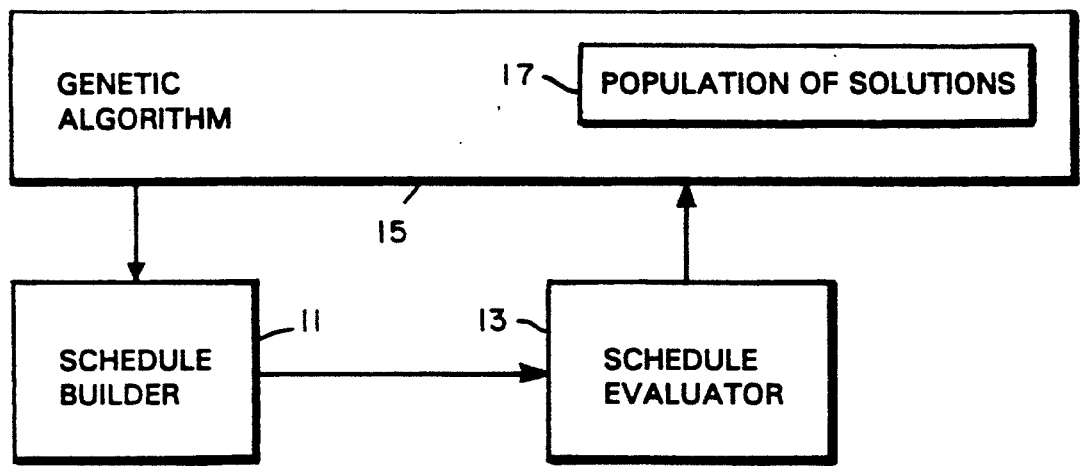
FIG. 2 is a diagrammatic illustration of a schedule generating system operating in accordance with the present invention.
FIG. 3 is a diagram illustrating a crossover operator employed in the genetic algorithm component of the system of FIG. 2.
FIG. 4 is a diagrammatic illustration of another type of crossover operator.

The method of the present invention may be conveniently understood as comprising three portions. With reference to FIG. 2, these three portions are a deterministic schedule builder as described above, designated by reference character 11; a schedule evaluator, designated by reference character 13; and a genetic algorithm 15. These portions or components operate on a population of possible solutions 17 maintained by the genetic algorithm.

In the genetic algorithm component of the system of the present invention, operators work on a population of members or chromosomes which are not simple binary vectors but, rather, are lists of tasks in various permutations of order. As explained in greater detail hereinafter, the nature of the operators used is such that the lists which constitute the population are always complete, that is, they always include all the tasks to be considered. As indicated previously, there will be associated with each of the tasks certain preferences or soft constraints. These preferences or soft constraints provide a mechanism for evaluating or scoring the schedules which are generated from the task lists by the deterministic schedule builder. Clearly, the scoring or evaluation will be highly dependent upon the specific nature of the scheduling task, that is, the evaluation function must capture what it is about schedules that make them seem good or bad to the users of the system. For example, there will typically be a priority associated with each task veering from preemptory to casual. Further, when not all requested tasks can be placed into a schedule, those with the lowest relative priority should be left out and the scoring function should take this into consideration. While the preferred type of genetic algorithm described herein is of the general type described as a "steady state" genetic algorithm, it should be understood that the method of the present invention could also be utilized with a genetic algorithm of the more common "generational" type in which entire populations are repetitively replaced.

While the preferred embodiment described herein is described in terms of scheduling tasks so as to best utilize available resources, it should be understood that the techniques of the present invention may also be applied to the scheduling or deploying of resources to tasks or events which are essentially predetermined in time in which case the chromosomes operated on by the genetic algorithm may be lists of the resources.

In a model scheduling problem used for the testing of the method of the present invention, the method was utilized to construct possible schedules for 90 tasks, each task requiring one to three hours and a set of up to 30 resources, i.e. this was a larger set similar to the example of FIG. 1. The 90 tasks were to be scheduled into a block of 40 hours. There was only a single instance of each resource so that a conflict for any resource was considered a hard constraint violation. Tasks were given respective priority values ranging from 1 to 100. A further soft constraint was added to specify that some of the tasks preferred to be scheduled during the first 12 hours.

For the model problem which was used to establish the performance characteristics described in greater detail hereinafter, the evaluation of schedules generated by the schedule builder was performed as follows. The evaluation of a schedule started with the sum of the priorities of all the tasks. For each task not placed into the schedule, its priority was subtracted from the sum. For each task placed into the schedule, its priority was added to the sum unless there was a soft constraint violation in which case only half of its priority was added. With this evaluation scheme, if no task were scheduled, the evaluation function returns zero. If a perfect schedule were constructed, the evaluation function would return twice the priority sum. In the model problem, however, construction of a perfect schedule was not possible since the number of tasks was too great for the time allotted.

In the genetic algorithm component of the method of the present invention, an initial population of such chromosomes is generated either entirely randomly or by some scheme employing both a random component and a domain specific knowledge. As is understood in the art, slanting or skewing of initial populations by the use of domain specific knowledge can speed up at least the initial operation of a genetic algorithm but it may cause the algorithm to miss possibly superior solutions.

In order to cause the population of possible solutions to evolve, the genetic algorithm component of the method of the present invention preferably employs a form of both crossover and mutation operators, the completeness of the member lists being preserved. As in known genetic algorithm systems, members of the existing population to which the operators are applied are selected stochastically based upon their score or ranking within the population. By the term "stochastically" is meant that a member with a relatively high score has a higher likelihood of being chosen or selected for participation in the operation than a relatively low scoring member but that there is also a randomizing component so that merely having a high score does not assure selection.

The preferred crossover operator used in the method of the present invention may conveniently be designated a position based crossover. For the crossover operation, two members of the existing population of lists are selected stochastically as described previously. The two selected members are conventionally referred to as "parents". A set of positions is selected randomly. At each selected position, the position of the corresponding task in one parent are imposed on the other parent. The other tasks in the list are shifted to accommodate the moved tasks so that the list is maintained complete. This imposition of task position from one parent on another can be performed in both directions so that two new members or lists are generated which can be added to the population. This position based crossover is illustrated in FIG. 3. Crossover operations of this type are referred to in the art as combination or recombination operators.

Another crossover operator effective in the method of the present invention may conveniently be termed order based crossover. Again, a set of positions is randomly selected. The order of tasks in the selected positions in one parent is imposed on the corresponding tasks in the other parent. Again, tasks in other positions in the list are shifted to accommodate the changes and maintain a list which is complete. This form of order based crossover is illustrated in FIG. 4.

The method of the present invention also contemplates that a mutation operator will be applied at intervals to a member of the existing population. Again, the list or member of the existing population selected for the operation is chosen stochastically. The preferred form of mutation operator may be designated order based mutation. In this operation, two tasks in the chosen list are selected at random and their positions are interchanged.

Alternate but less effective mutation operators which have been used may be termed position based mutation and scramble mutation. In position based mutation, two tasks in the chosen list or member chromosome are selected at random and the second task is placed before the first. In the scramble mutation operator, a set of positions within the list is chosen randomly and the order of the tasks in the selected positions are scrambled randomly.

As indicated previously, the method of the present invention has, for evaluation, been applied to a model problem which rather closely simulates a real world situation. The application of the method to this problem can be described with reference to the flowchart of FIG. 5 which illustrates the operation of the method, with further reference to actual numerical examples. The problem involved 90 tasks, each requiring one to three hours and a set of up to 30 resources. The 90 tasks were to be scheduled into a block of 40 hours.

Figure 5:
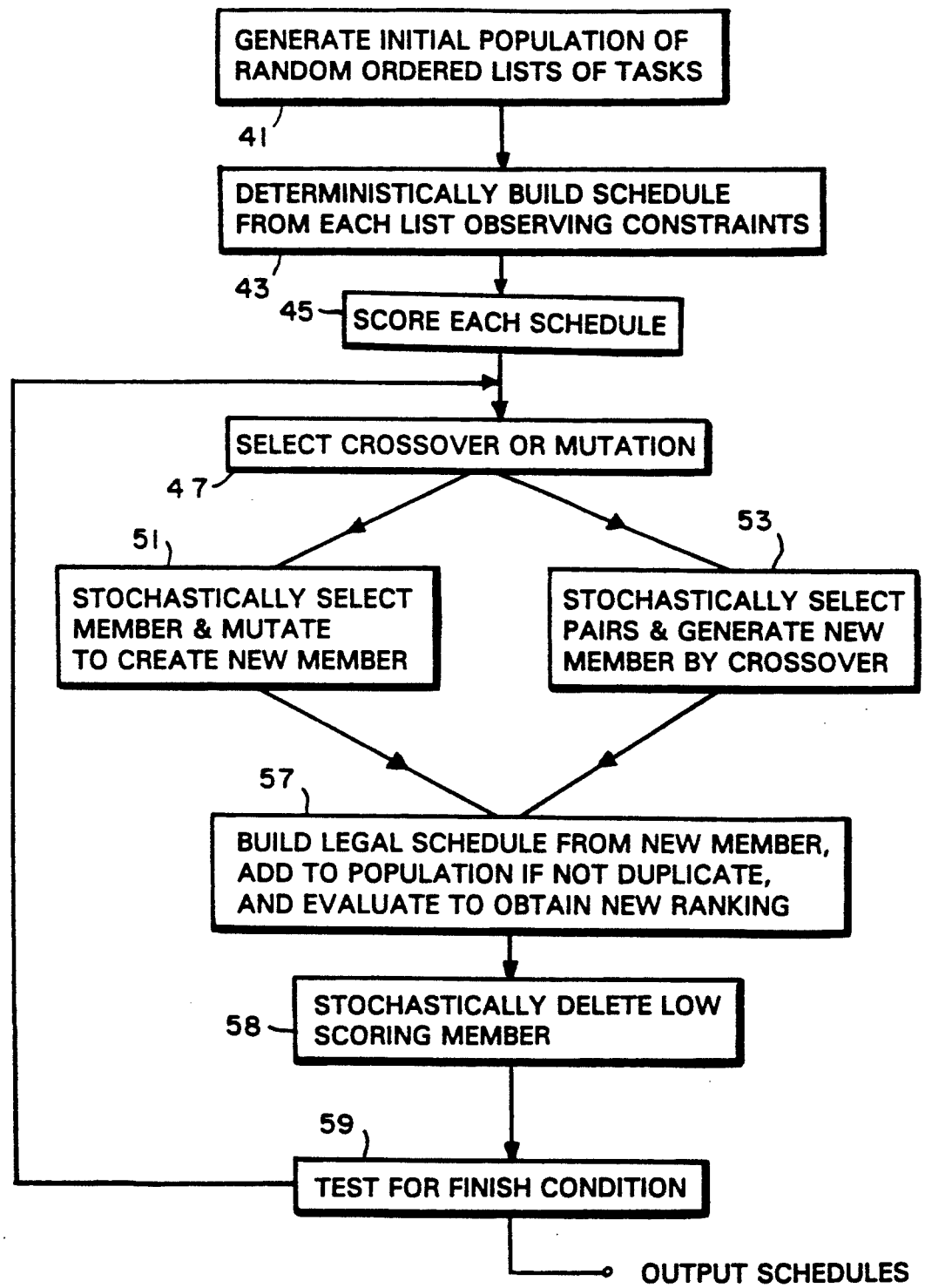
FIG. 5 is a flowchart illustrating the operation of the system of the present invention.

With reference to FIG. 5, the initial step, designated by reference character 41, is to generate an initial population of task lists. In the tests described hereinafter, the population comprised 30 members and each was a complete list including all of the tasks. In the tests described hereinafter, the initial population in each case was generated entirely randomly.

As indicated in block 43, each list in the initial population was then submitted to the deterministic schedule builder to generate a legal schedule, that is, a schedule which did not violate any hard constraints. In the test described in detail hereinafter, each successive task was fit into the schedule on a first come, first serve basis and was put into the schedule at the first position which would legally accept the task. A more complex schedule builder is described hereinafter but was not utilized in the numerical examples included in this specification. As indicated at block 45, each schedule so generated was then scored or evaluated using the evaluation function described previously herein.

As indicated previously, it is preferred that both crossover and mutation operators be utilized in the practice of the present invention. The respective rate or use of each operator can be either fixed or variable over the course of the operation of the genetic algorithm. A selection of either crossover or mutation to be employed on each cycle is indicated at block 47. In the case of constant and equal application of the two types of operators, this selection is simply an alternation between the two types. The mutation and crossover operations are designated by reference characters 51 and 53, respectively. The selected operators act as described previously herein to generate one or two new members. Again, the new members are complete lists of tasks. The new member lists are applied to the schedule builder and evaluated as indicated at block 57 and, if they do not already exist in the population, the new members are added to the population.

In order to maintain the population at the desired level, i.e. 30 members, lower scoring members are stochastically deleted from the population as indicated at block 58. The process then loops back to block 47 until a condition for completion of the running of the genetic algorithm is met. In the tests described herein, the genetic algorithm was run until a predetermined number of evaluations had been performed, i.e. 3000 evaluations. At this point, the current population was evaluated for its highest scoring member as indicated at block 59 and the corresponding schedule was output by the system. As should be understood, it will typically be appropriate to output several of the better scoring members for evaluation by a user's subjective standards.

Figures 6, 8:
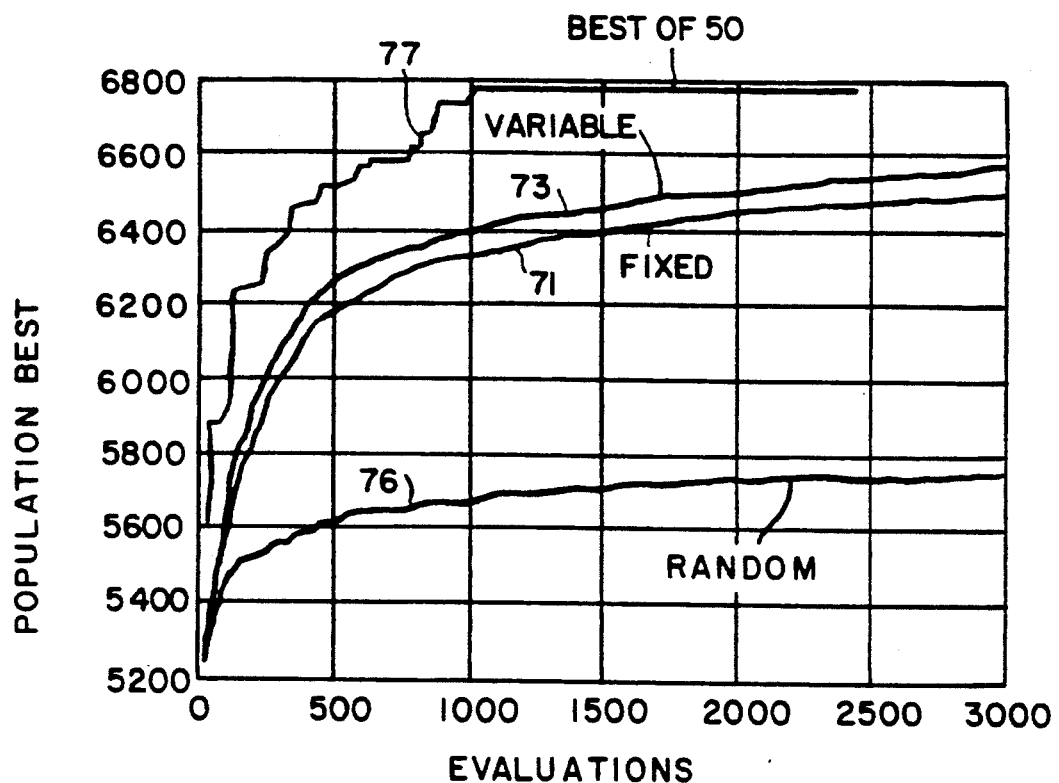
FIG. 6 is a graph illustrating the operation of one embodiment of the invention operating on a model scheduling problem.

The performance of the genethic algorithm in increasing the scoring of the best member in a population of lists which was initially created randomly is illustrated in FIG. 6. Curve 71 illustrates the progressive improvement obtained by using fixed and equal levels of position based crossover and order based mutation. Curve 73 illustrates the results using sliding probabilities for the application of each operator. In the sliding probability tests, the order based mutation rate was slowly increased while the position based crossover rate was gradually decreased during the running of the algorithm. As may be seen, this produced a slight improvement over the fixed rate tests. The basis for the curves plotted is the score of the best member in the population at any given point in the run. Further, 50 runs were made for each type and the values obtained were averaged for each corresponding point in each run to obtain the values used for plotting the curves 71 and 73.

To provide a frame of reference for illustrating that the application of the genetic algorithm component in the system of the present invention provided significant improvement, FIG. 6 also includes a curve, designated by reference character 76, which illustrates the gradual improvement of score which would be obtained if new task lists were just repetitively and continuously generated randomly, the lists being submitted to the schedule builder and the resulting schedules being scored in the same manner. Since the schedule builder itself will always attempt to schedule as many tasks as possible, the resultant scores are not orders of magnitude below those generated by the complete system and, understandably, show a gradual continuing increase over time. This is also in some ways a reflection of the manner of scoring employed.

Since the initial populations for each of the 50 runs which were averaged to arrive at curve 73 are generated and randomly and separately, it will be understood that some runs will be markedly better than others at any given point during the run and that curve 73 just presents the average at each point. Curve 77 represents the highest score of the then best run of the 50 runs which were done using sliding probabilities. The chance of occurrences such as this suggest that, in certain circumstances, it may be better to do a series of short runs rather than continuing a single run for an equivalent length of time. A demonstration program which operated on the model program as described herein is included as an appendix to this specification. The program is written in the Pascal programming language.

Figure 7:
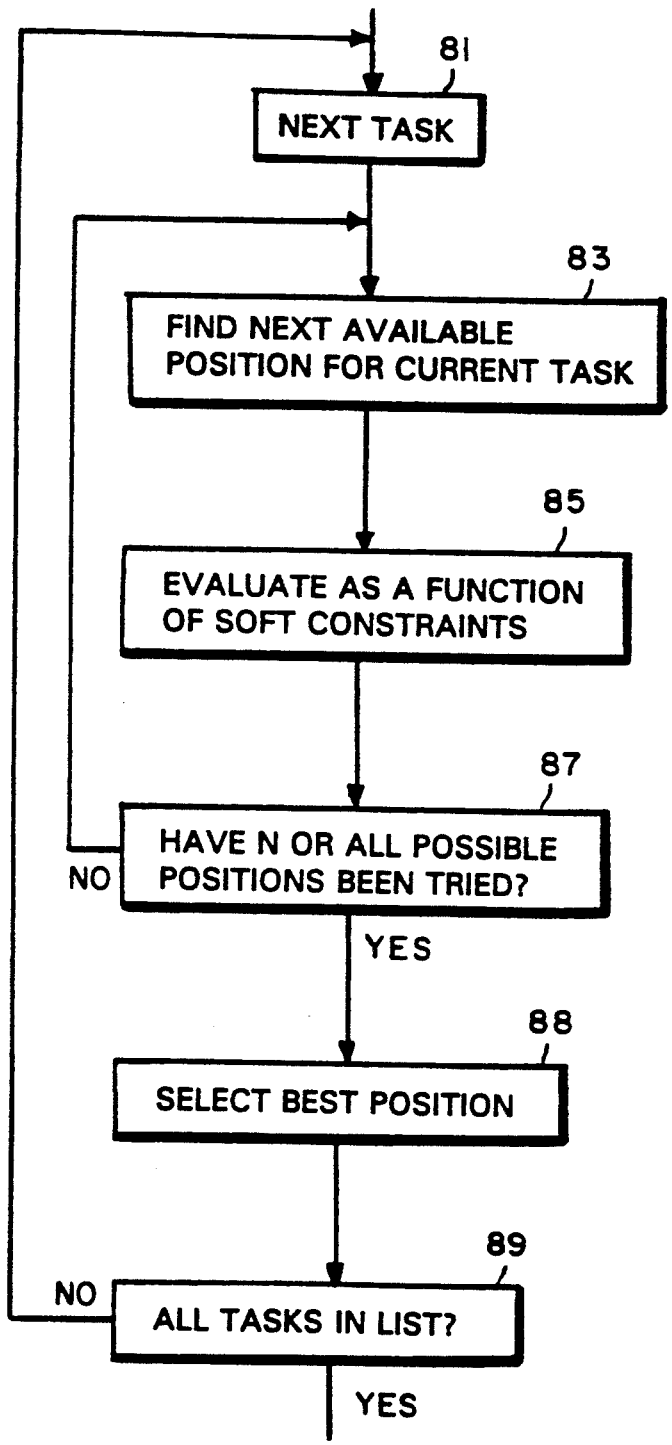
FIG. 7 is a flowchart illustrating an alternate form of a schedule building component for use in a system of the present invention.

As described hereinbefore, the schedule builder employed in testing with the model problem merely inserted each task into the schedule at the first position where it would legally fit. As indicated previously, it is possible to incorporate more intelligence or domain specific knowledge into the schedule builder to cause it to build better schedules, though still acting deterministically as a function of any given task list presented to it. FIG. 7 illustrates one such modification of the schedule builder.

The procedure illustrated in FIG. 7 also considers each task in the list in succession as indicated at block 81 but tries a preselected number of legal positions for inserting each successive task into the partial schedule built thus far. After each possible position is determined as indicated at block 83, the partial schedule resulting is then evaluated as a function of the soft or preferential constraints — block 85. The number of positions (N) for which the schedule builder evaluates a given task in the current list may be considered to be the depth of local search. After the preselected number of possibilities are tried, as tested at block 87, the best of the set is selected for addition into the new partial schedule before passing on to the next task in the current member list. In effect, the looping procedure of FIG. 7 can be substituted for the single step procedure indicated at block 43 in FIG. 5.

It is not, however, deemed desirable to add substantial intelligence to the schedule builder, i.e. to create a machine which in itself nearly performs a heuristic solving of the scheduling problem. If the schedule builder is made smarter, more and more chromosomes will result in the same schedule and thus the same evaluation. This will hide information from the genetic algorithm since a chromosome and a somewhat worse chromosome can both result in the same evaluation. In other words, if the schedule builder is not allowed to generate bad schedules in response to correspondingly bad list orderings of the tasks, the genetic algorithm component of the system will not have the necessary flexibility and may not consider certain arrangements which could lead to very good schedules. Rather, the method of the present invention is believed to perform best if the genetic algorithm is insulated from the domain specific knowledge as much as possible, the schedule builder operates to simply build legal schedules observing hard constraints, and the ranking of possible solutions is left to the schedule evaluator which takes into consideration the soft or preferential constraints.

While the operation of the system of the present invention has been described in the context of making all placements of the tasks to a schedule, it should be understood that the method may also be applied to a partially filled-in schedule. For example, if the user may have to place certain tasks at certain locations within the schedule for reasons which are sufficient to the user, it may not easily be encoded into the process. Such usage should also be understood to fall within the scope of the present invention.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

APPENDIX

```
program ga_main;
{*****************************************************}
{* GA_MAIN: genetic algorithm demonstration program for schedule
{*          optimization.
{*
{* Written by Gilbert Syswerda
{*
{* Written in Turbo Pascal 6.0 by Borland International
{*****************************************************} uses crt, printer, {units supplied by Borland} misc, menu, files, screen, get, time, {General utility units} ga_global, ga_misc, ga_error, ga_param, ga_bits, {GA units}
     ga_genome, ga_eval, ga_pop, ga_data, ga_sched;

const data_file_name = 'run.log';
```

```
var menu_main: menu_ptr;  {menus}
    OldExitProc: pointer;
    showing_best: boolean;{show each best evaluation}
    abort_run: boolean;

time_per_trial: str12;
    cnt1, cnt2, cnt3,cnt4: word;

procedure init_gen_stats;
{*********************************************************************}
{* initialize the values associated with generations
{*********************************************************************}
begin
  c.g := 0;
  c.e := 0;
end;

procedure show_gen_status;
{*********************************************************************}
{* display info generation by generation
{*********************************************************************}
var cv: realnum;
begin
   if showing_best then exit;

disp_mem;

with p do begin
      gotoxy (1,4);
      write ('Function: ':10, func_string[p.func]);
      gotoxy (35,4);
      writeln ('Time/trial: ', time_per_trial);
      writeln;
      writeln ('No dups: ', p.dup_check);
      writeln ('One_prob: ', p.one_prob:8:6,
              ', deletion prob: ', 1-c.delete_prob[0]:8:6,
                                   1-c.delete_prob[1]:9:6,
                                   1-c.delete_prob[2]:9:6);

writeln ('L: ':12, c.l:1);
      writeln ('M: ':12, c.m:1);
      writeln ('current M: ':12, c.current_m:1);
      writeln;
      writeln ('Trial: ':10, c.t:1, '  ');
      writeln ('Gen: ':10, c.g:1, '  ');
      writeln ('Eval cnt: ':10, c.e:1, ' Dups: ', c.d:1, '  ');

if not pop_initted then exit;

writeln ('Best: ':10, pop_list^.range:17:15, ' ',
              (c.max.min_range - pop_list^.range):17:15);
      writeln ('Worst: ':10, pop_list_tail^.range:17:15, '  ');
      writeln ('Average: ':10, (c.eval_sum/ c.m):17:15);
      writeln;

write (' Best: ');
      dispWords (pop_list^.w);
      writeln;

write ('Worst: ');
      dispWords (pop_list_tail^.w);

end;

end;

procedure run_a_generation;
{*********************************************************************}
{* run the GA for a single generation
{*********************************************************************}
var p1, p2, p3, p4, c1, c2, c3, c4, g_del: genome_ptr;
    w1, w2: wordstring;
    cnt: word;
    r: extended;
    c1_ok, c2_ok, c3_ok, c4_ok: boolean;
```

```
      t: integer;
      doing_cross: boolean;
begin
   if not trial_done then begin
      inc (c.g);

{ Ramped operator probs } c1_ok := false;
      c2_ok := false;
      c3_ok := false;

r := c.e / p.log_size;
      if r < 0.2 then r := 0.2;
      if r > 0.8 then r := 0.8;
      if r < random then begin
         p1 := select_good_one_by_fitness;
         cnt := 0;
         repeat
            p2 := select_good_one_by_fitness;
            inc (cnt);
         until (p1 <> p2) or (cnt > 10);

c1 := new_genome;
         c2 := new_genome;
         sched_cross_place (p1, p2, c1, c2, c1_ok, c2_ok);
         doing_cross := true;
         end
      else begin
         p3 := select_good_one_by_fitness;

c3 := new_genome;
         c3_ok := sched_mutate_swap (p3, nil, c3, nil);
         doing_cross := false;
         end;

{Do error checking} if c1_ok then
         if not check_wordstring (c1^.w) then disp_error (bad_wordstring);
      if c2_ok then
         if not check_wordstring (c2^.w) then disp_error (bad_wordstring);
      if c3_ok then
         if not check_wordstring (c3^.w) then disp_error (bad_wordstring);

{do dup checking} if p.dup_check then begin
         if c1_ok then begin
            c1_ok := dup_check (c1,c.l);
            if not c1_ok then inc (cnt1);
            end;
         if c2_ok then begin
            c2_ok := dup_check (c2,c.l);
            if not c2_ok then inc (cnt2);
            end;
         if c3_ok then begin
            c3_ok := dup_check (c3,c.l);
            if not c3_ok then inc (cnt3);
            end;
         end;

if doing_cross then begin
         if not c1_ok then
            dispose_genome (c1);
         if not c2_ok then
            dispose_genome (c2);
         end
      else
         if not c3_ok then
            dispose_genome (c3);

{evaluate and insert offspring}
```

```
        if c1_ok then begin
            eval (c1);
            insert (c1);
            if p.logging then
                update_log (pop_list^.range, false);
            end;

if c2_ok then begin
            eval (c2);
            insert (c2);
            if p.logging then
                update_log (pop_list^.range, false);
            end;

if c3_ok then begin
            eval (c3);
            insert (c3);
            if p.logging then
                update_log (pop_list^.range, false);
            end;

{adjust the population size} while c.current_m > c.m do begin
            g_del := select_bad_one_exponentially;
            delete (g_del);
            end;

if c.g mod p.disp_rate = 0 then show_gen_status;

end;
end;

procedure run_a_trial_sched;
{*****************************************************************}
{* Run a trial using the parameters in the current record (c)
{*****************************************************************}
const random_goal = 500;

var done: boolean;
    i: integer;
    ch: char;
    old_eval: realnum;

begin trial_done := false;
  showing_best := false;

random_pop;
  show_gen_status;
  c.g := 0;
  old_eval := 0.0;

while not trial_done do begin run_a_generation;

if keypressed then begin
        ch := readkey;
        if ch in ['P','p'] then
            repeat ch := readkey until ch in ['P','p',#27];
        if ch = #27 then begin
            delay (500);
            ch := ' ';
            if keypressed then ch := readkey;
            if ch in ['a','A'] then begin
                abort_run := true;
```

```
              exit;
              end;
           showing_best := false;
           end;

if ch in ['b','B'] then begin {show best}
          if showing_best then begin
             showing_best := false;
             clrscr;
             end
          else begin
             showing_best := true;
             old_eval := 0.0;
             end;
          end;

end;

if showing_best then begin
       if pop_list^.range <> old_eval then begin
          clrscr;
          show_the_sched (45,3);
          old_eval := pop_list^.range;
          end;
       gotoxy (70,2);
       write (c.g);
       end;

{check for trial termination via log count} if p.logging then if c.e > p.log_size then trial_done := true;

end; {while not trial_done} end;

procedure run_trials;
{*****************************************************}
{* Cycle thru the range of trials
{*****************************************************}
label stop_runs;
var i: integer;
    start_time, end_time, diff: time_def;
begin {cycle thru all trials} for c.t := 1 to p.num_trials do begin
     GetTime (start_time);
     remove_pop;
     init_gen_stats;
     run_a_trial_sched;
     GetTime (end_time);
     TimeDiff (start_time, end_time, diff);
     TimeStr (diff, time_per_trial, false);

if abort_run then goto stop_runs;
     end;

save_ascii_log (data_file_name);
  stop_runs:
    remove_log;
  end;

procedure init_menus;
{***********************************************************}
{* init_menus: init the menus used by main
{***********************************************************}
var ch: char;
    i: integer;
begin
   menu_main := new_menu ('MAIN');
   add_choice (menu_main, 'Params', 'Set system parameters',
```

```
                    ['P','p'], 1);
    add_choice (menu_main, 'Init',    'Initialize the system',
                ['I','i'], 9);
    add_choice (menu_main, 'New_pop','Create a random population',
                ['N','n'], 2);
    add_choice (menu_main, 'Remove', 'Remove the population',
                ['R','r'], 6);
    add_choice (menu_main, 'Start',  'Start simulation',
                ['S','s'], 3);
    add_choice (menu_main, 'List',   'List the population',
                ['L','l'], 4);
    add_choice (menu_main, 'Default','Use default parameters',
                ['D','d'], 5);
    add_choice (menu_main, 'Map',    'Show the current problem',
                ['M','m'], 7);
    add_choice (menu_main, '?',      'Some unspecified debugging function',
                ['?'], 8);
    add_choice (menu_main, 'Quit',   'Quit this program and return to DOS',
                ['Q','q'], 10);
    finish_menu (menu_main);
end;

procedure show_sched;
{***************************************************************}
{*
{***************************************************************}
var ws: wordstring;
    ch: char;
    i: word;
    g: genome_ptr;
    e: realnum;
begin
  new (g);
  for i := 1 to c.1 do g^.w[i] := i;
  clrscr;

e := eval_sched (g, 0);
  for i := 1 to c.1 do begin
     show_task_list (g^.w, 1,1);
     show_the_sched (47,1);
     gotoxy (47, wherey+1);
     write ('Evaluation = ', e:8:3);
     ch := readkey;

if ch = #27 then begin
        clrscr;
        init_sched;
        dispose (g);
        exit;
        end;

e := eval_sched (g, i);
     end;
  clrscr;
  dispose (g);
end;

procedure main_menu;
{***************************************************************}
{* main_menu: present the main menu
{***************************************************************}
var done: boolean;
    i: integer;
    ch: char;
begin
  done := false;

repeat
     clrscr;
     show_gen_status;

i := get_choice (menu_main);

case i of
```

```
        1: param_menu;

9: begin                              {init}
               remove_pop;
               init_gen_stats;
               init_current_record;
               calc_current_record;
               init_eval;
               init_log (p.log_size, p.log_rate);
               time_per_trial := '';
           end;

2: begin                              {random pop}
               if eval_initted then begin
                   random_pop;
               end
               else write (#7);
           end;

3: begin
               if eval_initted then begin
                   abort_run := false;
                   run_trials;                {start}
                   {switch_to_text;}
                   textmode (co80+font8x8);
                   showing_best := false;
               end
               else write (#7);
           end;

4: list_pop;                          {list}
        5: begin
               init_p;                        {default}
               init_current_record;
               calc_current_record;
           end;

6: begin                              {remove}
               remove_pop;
           end;

7: show_sched;                        {map}

8: begin                              {?}
           end;

10,0: done := true;

end; {case}
   until done;
end;

{$F+}
procedure MyExitProc;
{***************************************************}
{*
{***************************************************}
begin
   ExitProc := OldExitProc; { Restore exit procedure address }
end; { MyExitProc }
{$F-} procedure initialize;
{***************************************************}
{*
{***************************************************}
var i,j: word;
begin
   OldExitProc := ExitProc;              { save previous exit proc }
   ExitProc := @MyExitProc;              { insert our exit proc in chain }
   init_menus;
   showing_best := false;
   init_current_record;
   calc_current_record;
```

```
      time_per_trial := 'not known';

cnt1 := 0;
      cnt2 := 0;
      cnt3 := 0;
      cnt4 := 0;
   end;

begin textmode (co80+font8x8);
   TextBackground (black);
   TextColor (lightgray);
   LowVideo;
   clrscr;
   randomize;

initialize;

clrscr;

init_gen_stats;

main_menu;
   clrscr;
end.
unit ga_bits;

{*****************************************************************}
{* Manipulatin of word strings (previously bitstrings}
{*****************************************************************}

INTERFACE uses ga_global;

function word_equalp (var w1, w2: wordstring;
                      cnt: word): boolean;
procedure dispWords (var w: wordstring);
procedure random_wordstring (var w: wordstring);
function  check_wordstring (var w: wordstring): boolean;

IMPLEMENTATION uses ga_param, ga_error;

function word_equalp (var w1, w2: wordstring;
                      cnt: word): boolean;
{*************************************************}
{* return true if w1 is equal to w2
{*************************************************}
var i: word;
begin
   for i := 1 to cnt do
      if w1[i] <> w2[i] then begin
         word_equalp := false;
         exit;
         end;
   word_equalp := true;
end;

procedure dispWords (var w: wordstring);
{*********************************************************************}
{* Write the string of words to the screen
{*********************************************************************}
var i,j: word;
    flag: boolean;
begin
   flag := false;
   j := c.1;
   if j > 23 then begin
      j := 23;
      flag := true;
      end;
```

```
        for i := 1 to j do
            write (w[i]:3);
        if flag then write ('>');
    end;

function check_wordstring (var w: wordstring): boolean;
    {*******************************************************}
    {* Check the word string for duplicate numbers
    {*******************************************************}
    var b: array [1..max_wordstring_size] of boolean;
        i: word;
    begin
        check_wordstring := false;
        for i := 1 to c.1 do b[i] := false;
        for i := 1 to c.1 do begin
            if b[w[i]] then exit;
            b[w[i]] := true;
            end;
        for i := 1 to c.1 do
            if not b[i] then exit;
        check_wordstring := true;
    end;

procedure random_wordstring (var w: wordstring);
    {*********************************************************************}
    {* create a random bit string
    {*********************************************************************}
    var i,j: word;
        a: array [1..max_wordstring_size] of word;
    begin
        for i := 1 to c.1 do
            a[i] := i;
        for i := c.1 downto 1 do begin
            j := random (i) + 1;
            w[i] := a[j];
            a[j] := a[i];
            end;
        if not check_wordstring (w)
            then disp_error (bad_wordstring);
    end;

end.

{$O+,F+}
    unit ga_data;
    {*****************************************************************}
    {* Module for recording data during a simulation run.
    {*****************************************************************}

INTERFACE uses ga_global;

var log_initted: boolean;

procedure init_log (max_eval_count, increment: word);
    procedure update_log (var val: realnum;
                              solved: boolean);
    procedure save_ascii_log (name: string);
    procedure remove_log;

IMPLEMENTATION uses crt, ga_param, ga_error;

const max_log_size = 3500; {This can be as large as possible. Not all the}
                               {memory is necessarily allocated}
```

```
type log_rec = record
      pop_max: small_realnum;
      run_low, run_high: small_realnum;
      squares: small_realnum;
      solved_cnt: word;  {number of trials solved by now}
      end;

log_array = array [0..max_log_size] of log_rec; {variable length}
    log_array_ptr = ^log_array;

var log: log_array_ptr;      {the log itself}
    log_size: word;          {the number of entries in the log}
    log_mem_size: word;      {amount of memory needed by the log}
    max_log_eval_cnt: word;  {the max evaluation count covered by the log}
    log_increment: word;     {the recording increment} procedure init_log (max_eval_count, increment: word);
{*****************************************************}
{* allocate enough memory for the size specified and initialize
{* the log to size
{*****************************************************}
var i: integer;
begin
  if not p.logging then exit;
  if log_initted then remove_log;

{compute how many log entries there will be} log_size := (max_eval_count div increment);
  if log_size > max_log_size then
     disp_error (log_too_large);

log_mem_size := sizeof (log_rec) * (log_size+2); {2 is a safety margin}
  getmem (log, log_mem_size);
  max_log_eval_cnt := max_eval_count;
  log_increment := increment;

for i := 1 to log_size do begin
     with log^[i] do begin
        pop_max := 0.0;
        run_low := 99e10;
        run_high := -99e10;
        squares := 0.0;
        solved_cnt := 0;
        end;
     end;

log_initted := true;
end;

procedure update_log (var val: realnum;
                      solved: boolean);
{*****************************************************}
{* Add values to the log. Checks for log overrun. This routine
{* uses the global variable EVAL_CNT.
{*****************************************************}
var i: word;
begin
  if not p.logging then exit;
  if not log_initted then disp_error (log_not_initted);

if c.e mod log_increment <> 0 then exit; {inbetween increments}
  if c.e > max_log_eval_cnt then exit; {log is full} with log^[c.e div log_increment] do begin
     pop_max := pop_max + val;
     if val < run_low then run_low := val;
     if val > run_high then run_high := val;
     squares := squares + sqr (val);
     if solved then inc (solved_cnt);
     end;
end;
```

```pascal
procedure save_ascii_log (name: string);
{*********************************************}
{* Save the log in ASCII form in the file NAME
{*********************************************}
var outfile: text;
    i: word;
    v: extended;
begin
  if not p.logging then exit;
  assign (outfile, name);
  rewrite (outfile);

writeln (outfile, '"Output of GA4"');
  write (outfile, '"Problem ', func_string[p.func]);
  if p.maximizing
     then writeln (outfile, '    maximizing', '"')
     else writeln (outfile, '    minimizing', '"');
  writeln (outfile, '"Aligned: ', p.align, '"');
  writeln (outfile, '"No dups: ', p.dup_check, '"');
  writeln (outfile, '"One_prob: ', p.one_prob:8:6,
                 ', Deletion prob: ', 1-c.delete_prob[0]:8:6, '"');
  writeln (outfile,
           '"l=', c.l:1,
           ' m=', c.m:1,
           ' T=',c.t:1,
           '"');

writeln (outfile);
  writeln (outfile, '"', p.c1, '"');
  writeln (outfile, '"', p.c2, '"');
  writeln (outfile, '"', p.c3, '"');
  writeln (outfile, '"', p.c4, '"');

writeln (outfile);

writeln (outfile, '"Evals"':6, '"pop best"':12, '"% solved"':12, '"^run low"':
           '"run high"':12, '"S"':12, '"avg + S"':12);

for i := 1 to log_size do begin
     with log^[i] do begin
        v := (c.t * squares - sqr (pop_max)) / (c.t * (c.t - 1));
        writeln (outfile, i*log_increment:6,
                          (pop_max / c.t):12:5,
                          (solved_cnt / c.t):12:5,
                          run_low:12:5,
                          run_high:12:5,
                          sqrt (v):12:5,
                          (pop_max / c.t) + sqrt (v):12:5);
        end;
     end;
  close (outfile);
end;

procedure remove_log;
{*********************************************}
{* deallocate the log
{*********************************************}
begin
  if log_initted then
     freemem (log, log_mem_size);
  log_initted := false;
end;

begin
  log_initted := false;
end.
```

```
    unit ga_error;

{*******************************************************************}
{*
{*******************************************************************}

INTERFACE uses crt;

const missing_param_file = 1;
      bad_p_file = 2;
      log_too_large = 3;
      log_not_initted = 4;
      cnt_exceeded = 5;
      bad_wordstring = 6;
      bad_parent = 7;
      bad_before = 8;
      bad_after_eval = 9;
      bad_after_insert = 10;
      max_errors = 10;

procedure disp_error (e: byte);

IMPLEMENTATION var error_list: array [1..max_errors] of string[50];

procedure init_error_list;
{*******************************************************************}
{* init the error list
{*******************************************************************}
begin
   error_list[1] := 'Missing parameter file';
   error_list[2] := 'Wrong or old version of parameter file';
   error_list[3] := 'The log requirements exceed the max space allowed for it';
   error_list[4] := 'Log is not initialized';
   error_list[5] := 'Count exceeded';
   error_list[6] := 'Bad wordstring';
   error_list[7] := 'Bad parent';
   error_list[8] := 'Bad before';
   error_list[9] := 'Bad after eval';
   error_list[10] := 'Bad after insert';
end;

procedure disp_error (e: byte);
{*******************************************************************}
{* error: disp an error mesage and halt;
{*******************************************************************}
begin
  clrscr;
  gotoxy (10,1);
  writeln ('Error: ', error_list[e]);
  writeln (#7);
  halt;
end;

begin
  init_error_list;
end.

unit ga_eval;

{*******************************************************************}
{*
{*******************************************************************}

INTERFACE uses screen, ga_global;
```

```
procedure eval (g: genome_ptr);
procedure calc_eval_max;
function  function_solved (g: genome_ptr): boolean;
procedure select_function (func: funcs);
procedure init_eval;

var eval_initted: boolean;

IMPLEMENTATION uses ga_param, ga_genome, ga_bits, ga_misc, ga_sched;

procedure eval (g: genome_ptr);
{***************************************************}
{* The general eval function. Calculates the range value
{* of the genome for the current function.
{***************************************************}
begin
   case p.func of
      sched:  g^.range := eval_sched (g, c.l);
      end;
   inc (c.e);
end;

procedure calc_eval_max;
{***************************************************}
{* Calculate the max for the current function, and place
{* the results in the current record.
{***************************************************}
begin
   case p.func of
      sched: calc_sched_max;
      end;
end;

function function_solved (g: genome_ptr): boolean;
{***************************************************}
{* Decide whether the genome solves the current problem.
{***************************************************}
begin
   case p.func of
      sched: function_solved := false;
      end;
end;

procedure select_function (func: funcs);
{***************************************************}
{* set which function will be called by eval
{***************************************************}
begin
   p.func := func;
   init_current_record;
   calc_current_record;
   calc_eval_max;
end;

procedure init_eval;
{*******************************************************}
{* Initialize the function to be evaluated
{*******************************************************}
begin
   case p.func of
      sched: begin
         random_task_list;
         end;
      end;
   eval_initted := true;
end;

begin
   eval_initted := false;
end.
```

```
unit ga_genome;

{*****************************************************************}
{* Definitions and patterns for a chromosome
{*****************************************************************}

INTERFACE uses ga_global;

function new_genome: genome_ptr;
procedure dispose_genome (var g: genome_ptr);

IMPLEMENTATION uses ga_param;

function new_genome: genome_ptr;
{*********************************************************************}
{* Create a new genome on the heap, complete with wordstring
{*********************************************************************}
var g: genome_ptr;
begin
  new (g);
  {new (g^.w);}
  g^.range := 0.0;
  new_genome := g;
end;

{*****************************************************}
{* Remove the genome from the heap
{*****************************************************}
procedure dispose_genome (var g: genome_ptr);
begin
  {dispose (g^.w);
  g^.w := nil;}
  dispose (g);
  g := nil;
end;

end.

unit ga_global;

{*****************************************************************}
{* Global definitions
{*****************************************************************}

INTERFACE uses misc;

const max_wordstring_size = 1001; {as large as needed} type realnum = extended;
     small_realnum = single;
     word_type = word;

funcs = (sched);

wordstring_ptr = ^wordstring;
     wordstring = array [1..max_wordstring_size] of word_type;

genome_ptr = ^genome;
     genome = record
        w: wordstring;           {explicit order genome}
        range: realnum;          {evaluated bitstring or domain}
        next, prev: genome_ptr;  {population list pointers}
        end;

const func_string: array [funcs] of string =
        ('scheduler');
```

```
var trial_done: boolean; {if true, the current trial is solved}

{*****************************************************************}
{* Variables global across all units
{*****************************************************************}
var pop_list, pop_list_tail: genome_ptr;   {population head and tail}
    circle_size: word;                     {size to draw nodes}

IMPLEMENTATION begin
  trial_done := false;
  pop_list := nil;
  pop_list_tail := nil;
  circle_size := 4; {city display size}
  {freemIn := 8191;}   {<<<<<<<<<<<<<<<<< NOTICE NOTICE <<<<<<<<}
end.

unit ga_misc;

{*****************************************************************}
{*
{*****************************************************************}

INTERFACE uses crt, ga_global;

function XtotheY (x,y: realnum): realnum;
procedure disp_mem;

IMPLEMENTATION uses ga_param;

function XtotheY {x,y: realnum): realnum};
{*****************************************************************}
{*
{*****************************************************************}
begin
  XtotheY := exp (ln (x) * y);
end;

procedure disp_mem;
{*****************************************************************}
{*
{*****************************************************************}
begin
  gotoxy (65,3);
  write (c.current_m:6);
  gotoxy (75,3);
  write (memavail:6);
  gotoxy (75,4);
  write (maxavail:6);
end;

end.

unit ga_param;

{*****************************************************************}
{*
{*****************************************************************}

INTERFACE uses crt,
     files, menu, screen, get,
     ga_error, ga_global;
```

```
type word_range = record
      low, high: word;
      end;

real_range = record
      low, high: realnum;
      end;

type param_rec = record
      func: funcs;                  {function to optimize}
      maximizing: boolean;          {whether func should be min'ed or max'ed}
      align: boolean;               {should chromosomes be aligned}
      one_prob: realnum;            {probability the pop best will be deleted}
      l: word;                      {"length" of the order}
      m: word;                      {pop size}
      num_trials: word;             {number of trials to average}
      disp_rate: word;              {rate at which to update screen}
      dup_check: boolean;           {allow dups in pop?}
      logging: boolean;             {true if logging results to disk}
      log_size: word;               {number of evals before trial ends}
      log_rate: word;               {eval increment in log} sched_hours: word;            {number of hours to schedule for} c1, c2, c3,c4: string[80];    {comments to be written to data file}
      outfile_name: string[30];     {where to write data}
      ok: string[2];                {used as record validity check}
      end;

current_rec = record
      l: word;
      m: word;                      {wordstring length}
      current_m: word;              {pop size to maintain at}
      g: word;                      {dynamically changing population size}
      e: word;                      {current generation}
      d: word;                      {evaluation count}
      t: word;                      {dup cnt}
      eval_sum: realnum;            {current trial}
                                    {eval sum of entire population}
      delete_prob: array [0..6] of realnum; {prob any member, starting at}
                                            {end, is deleted. Index is amt}
                                            {over ideal pop size}
      max: record
         range: realnum;            {range value that is solution}
         delta_range: realnum;      {acceptable area around val}
         min_range: realnum;        {range - delta_range}
         end;
      end;

var p: param_rec;
       c: current_rec;

procedure init_p;
   procedure disp_p;
   procedure read_p;
   procedure write_p;
   procedure init_current_record;
   procedure calc_current_record;
   procedure param_menu;

IMPLEMENTATION uses ga_misc, ga_pop, ga_eval, ga_data;

const p_name = 'param.dat';

var menu_log, menu_sched, menu_flags, menu_param,
       menu_comments: menu_ptr;

procedure init_current_record;
   {***************************************************}
   {* Initialize the current record's values that normally
   {* change during a run.
   {***************************************************}
```

```
    var i: word;
begin
  c.l := p.l;
  c.m := p.m;
  c.current_m := 0; {assume no current population}
  c.t := 0;
  c.g := 0;
  c.e := 0;
  c.d := 0;
  c.eval_sum := 0.0;
  c.max.range := 0.0;
  c.max.delta_range := 0.0;
  c.max.min_range := 0.0;
  for i := 0 to 6 do
      c.delete_prob[i] := exp (ln (p.one_prob) / (p.m + i));
end;

procedure calc_current_record;
{****************************************************}
{* Calculate the variable fields in the current record
{* based on the possibly changing fields in the current record.
{****************************************************}
begin
  calc_eval_max;
end;

procedure init_p;
{****************************************************************************}
{* initialize the parameters with defaults
{****************************************************************************}
begin
  with p do begin
    func := sched;
    l := 16;
    m := 50;
    one_prob := 0.001;
    num_trials := 1;
    dup_check := true;
    logging := false;
    log_size := 2000;
    log_rate := m;
    sched_hours := 40;
    maximizing := true;
    align := false;
    outfile_name := 'run.log';
    c1 := 'Comment 1';
    c2 := 'Comment 2';
    c3 := 'Comment 3';
    c4 := 'Comment 4';
    end;
end;

procedure disp_p;
{****************************************************************************}
{* disp_p
{****************************************************************************}
begin
  clrscr;
  gotoxy (1,4);
  with p do begin
      writeln ('Function: ':25, func_string[func]);
      writeln ('Maximizing: ':25, maximizing);
      writeln;
      writeln ('String length (l): ':25, l:1);
      writeln ('Population size (m): ':25, m:1);
      writeln ('Number of trials: ':25, p.num_trials);
      writeln;
      writeln (' Logging: ', logging);
      writeln ('    Rate: ', log_size:1);
      writeln ('    Size: ', log_rate:1);
      writeln;
      writeln ('One prob: ', p.one_prob:8:6);
      end;
end;
```

```
procedure write_p;
{***************************************************************}
{* write_p: write the parameter file
{***************************************************************}
var out_p: file of param_rec;
begin
  p.ok := 'OK';
  assign (out_p, p_name);
  rewrite (out_p);
  write (out_p, p);
  close (out_p);
end;

procedure read_p;
{***************************************************************}
{* read_p: read the parameter file
{***************************************************************}
var in_p: file of param_rec;
begin
   if not fileexist (p_name) then begin
      init_p;
      write_p;
      end;

assign (in_p, p_name);
   reset (in_p);
   read (in_p, p);
   if p.ok <> 'OK' then disp_error (bad_p_file);
   close (in_p);
end;

procedure init_menu;
{***************************************************************}
{* init the param menu
{***************************************************************}
var ch: char;
    i: integer;
begin menu_param := new_menu ('PARAM');
  add_choice (menu_param, 'L',      'order size L',
             ['L','l'], 1);
  add_choice (menu_param, 'M',      'population size M',
             ['M','m'], 2);
  add_choice (menu_param, 'T',      'Number of Trials',
             ['T','t'], 3);
  add_choice (menu_param, 'Eval',   'Evaluation function',
             ['E','e'], 4);
  add_choice (menu_param, 'Dir',    'Minimize or maximize',
             ['D','d'], 8);
  add_choice (menu_param, 'Options','Change options',
             ['O','o'], 5);
  add_choice (menu_param, 'loG',    'Change log options',
             ['G','g'], 6);
  add_choice (menu_param, 'Com',    'Comments and file name',
             ['C','c'], 9);
  add_choice (menu_param, 'Prob',   'Probability first member deleted',
             ['P','p'], 10);
  add_choice (menu_param, 'Save',   'Save parameters',
             ['S','s'], 7);
  add_choice (menu_param, 'Quit',   'Quit this program and return to DOS',
             ['Q','q'], 11);
  finish_menu (menu_param);

menu_sched := new_menu ('SCHED');
  add_choice (menu_sched, 'Hours',     'Set number of hours to schedule',
             ['H','h'], 1);
  add_choice (menu_sched, 'Exit',      'Exit this menu',
             ['E','e'], 9);
  finish_menu (menu_sched);
```

```
    menu_log := new_menu ('Log');
    add_choice (menu_log, 'Logging',    'Toggle logging status',
                ['L','l'], 1);
    add_choice (menu_log, 'Size',       'Log size',
                ['S','s'], 2);
    add_choice (menu_log, 'Rate',       'Loggin rate',
                ['R','r'], 3);
    add_choice (menu_log, 'Exit',       'Exit this menu',
                ['E','e'], 9);
    finish_menu (menu_log);

menu_flags := new_menu ('Flags');
    add_choice (menu_flags, 'Rate',     'Display generation info rate',
                ['R','r'], 1);
    add_choice (menu_flags, 'Dup check', 'Duplication checking',
                ['D','d'], 2);
    add_choice (menu_flags, 'Align',    'Align the chromosomes',
                ['A','a'], 3);
    add_choice (menu_flags, 'Exit',     'Exit this menu',
                ['E','e'], 9);
    finish_menu (menu_flags);

menu_comments := new_menu ('Comments');
    add_choice (menu_comments, 'File',   'Output file name',
                ['F','f'], 1);
    add_choice (menu_comments, 'c1', 'Comment 1',
                ['1'], 2);
    add_choice (menu_comments, 'c2', 'Comment 2',
                ['2'], 3);
    add_choice (menu_comments, 'c3', 'Comment 3',
                ['3'], 4);
    add_choice (menu_comments, 'c4', 'Comment 4',
                ['4'], 5);
    add_choice (menu_comments, 'Exit',   'Exit this menu',
                ['E','e'], 9);
    finish_menu (menu_comments);

end;

procedure comments_menu;
{*****************************************************************}
{* present the comments menu
{*****************************************************************}
var done: boolean;
    i,j: integer;
    ch: char;
    ans: word;
    count_change, init_c: boolean;
begin
  done := false;

repeat
     clrscr;

gotoxy (1,5);
     writeln ('File name: ':12, p.outfile_name);
     writeln ('C1: ':12, p.c1);
     writeln ('C2: ':12, p.c2);
     writeln ('C3: ':12, p.c3);
     writeln ('C4: ':12, p.c4);

i := get_choice (menu_comments);

case i of    {display rate}
        1: begin
              clear_from (20);
              gotoxy (1,20);
              write ('Enter file name: ');
              readln (p.outfile_name);
           end;
        2: begin
              clear_from (20);
              gotoxy (1,20);
              write ('C1: ');
```

```
                readln (p.c1);
              end;
           3: begin
                clear_from (20);
                gotoxy (1,20);
                write ('C2: ');
                readln (p.c2);
              end;
           4: begin
                clear_from (20);
                gotoxy (1,20);
                write ('C3: ');
                readln (p.c3);
              end;
           5: begin
                clear_from (20);
                gotoxy (1,20);
                write ('C4: ');
                readln (p.c4);
              end;
           9,0: begin { quit }
                done := true;
              end;
        end; {case}
   until done;

end;

procedure option_menu;
{*****************************************************}
{* present the options menu
{*****************************************************}
var done: boolean;
    i,j: integer;
    ch: char;
    ans: word;
    count_change, init_c: boolean;
begin
  done := false;

init_c := false;
  count_change := false;

repeat
     clrscr;

gotoxy (1,5);
     writeln ('Display rate: ':25, p.disp_rate:1);
     writeln ('Dup check: ':25, p.dup_check);
     writeln ('Align: ':25, p.align);

i := get_choice (menu_flags);
     case i of    {display rate}
        1: begin
              clear_from (20);
              gotoxy (1,20);
              write ('Enter display rate: ');
              get_word (p.disp_rate, true);
           end;
        2: begin   {dup check}
              p.dup_check := not p.dup_check;
           end;
        3: begin   {dup check}
              p.align:= not p.align;
           end;
        9,0: begin { quit }
              done := true;
           end;
     end; {case}
   until done;

end;
```

```pascal
procedure sched_menu;
{************************************************************}
{* present the scheduler menu
{************************************************************}
var done: boolean;
    i,j: integer;
    ch: char;
    ans: word;
    count_change, init_c: boolean;
begin
  done := false;
  init_c := false;
  count_change := false;

repeat
     clrscr;

gotoxy (1,5);
     write ('Hours: ':20, p.sched_hours);

i := get_choice (menu_sched);
     case i of
        1: begin {map type}
             clear_from (20);
             gotoxy (1,20);
             write ('Hours: ');
             get_word (p.sched_hours, true);
             end;
        9,0: begin { quit }
               done := true;
               end;
     end; {case}
  until done;

end;

procedure log_menu;
{************************************************************}
{* present the log menu
{************************************************************}
var done: boolean;
    i,j: integer;
    ch: char;
    ans: word;
begin
  done := false;

repeat
     clrscr;

gotoxy (1,5);
     writeln ('Logging: ':25, p.logging);
     writeln ('Size: ':25, p.log_size:1);
     writeln ('Rate: ':25, p.log_rate:1);

i := get_choice (menu_log);

case i of
        1: begin   {toggle}
             p.logging := not p.logging;
             end;
        2: begin   {log_size}
             clear_from (20);
             gotoxy (1,20);
             write ('Enter log size: ');
             get_word (p.log_size, true);
             end;
        3: begin   {log_rate}
             clear_from (20);
             gotoxy (1,20);
             write ('Enter logging rate: ');
             get_word (p.log_rate, true);
             end;
```

```pascal
            9,0: begin        { quit }
                   done := true;
                   end;
         end; {case}
    until done;
    init_log (p.log_size, p.log_rate);
end;

procedure param_menu;
{*************************************************************}
{* present the param menu
{*************************************************************}
var big_change, done: boolean;
    i,j: integer;
    ch: char;
    ans: word;
begin
  done := false;
  big_change := false;

repeat
     clrscr;
     disp_p;

i := get_choice (menu_param);

case i of
        1: begin  {wordstring length}
              clear_from (20);
              gotoxy (1,20);
              write ('Enter order length (max ', max_wordstring_size:1, '): ');
              get_word (p.l, true);
              big_change := true;
              end;
        2: begin  {population size}
              clear_from (20);
              gotoxy (1,20);
              write ('Enter population size: ');
              get_word (p.m, true);
              big_change := true;
              end;
        3: begin  {trials}
              clear_from (20);
              gotoxy (1,20);
              write ('Enter number of trials: ');
              get_word (p.num_trials, true);
              end;
       10: begin  {one_prob}
              clear_from (20);
              gotoxy (1,20);
              write ('Enter chance of best being deleted: ');
              readln (p.one_prob);
              end;
        4: begin {function}
              clear_from (20);
              gotoxy (1,20);
              write ('Select function:');
              ans := menu_list ('sched');
              case ans of
                 1: begin
                       p.func := sched;
                       sched_menu;
                       end;
                 end; {case}
              end;
        8: begin {minimize/maximize}
              p.maximizing := not p.maximizing;
              end;
        5: begin
              option_menu;
              end;
        9: begin
              comments_menu;
              end;
```

```
        6: begin
              log_menu;
              end;
        7: begin
              write_p;
              end;
        11,0: begin        { quit }
              done := true;
              end;
            end; {case}
         until done;

if big_change then begin
            remove_pop;
            init_current_record;
            calc_current_record;
            end;
      end;

begin
        init_menu;
        read_p;
        init_current_record;
        calc_current_record;
      end.

unit ga_pop;

{****************************************************************}
{* Population routines
{****************************************************************}

INTERFACE uses crt,
     screen,
     ga_global;

var pop_initted: boolean;

conv: array [1..max_wordstring_size] of word;

procedure list_pop;
procedure delete (g: genome_ptr);
procedure insert (g: genome_ptr);
procedure remove_pop;
procedure random_pop;
function  select_good_one_by_fitness: genome_ptr;
function  select_bad_one_exponentially: genome_ptr;
function  select_bad_one_randomly_with_elitism: genome_ptr;
function  dup_check (g: genome_ptr;
                     cnt: word): boolean;

IMPLEMENTATION uses ga_misc, ga_bits, ga_genome, ga_eval, ga_param, ga_data;

procedure list_pop;
{****************************************************************}
{*
{****************************************************************}
var cnt,i,s: longint;
    place: genome_ptr;
    ch: char;
const max_line = {22}47; {screen size}
begin
{ clear_from (3);
  cnt := 0;

gotoxy (1,3);.}
  i := 0;

place := pop_list;
  while place <> nil do begin
      inc (i);
      inc (cnt);
```

```
          if cnt = max_line then begin
             gotoxy (1,50);
             write ('Key space to continue...');
             ch := readkey;
             if ch = #27 then exit;
             cnt := 1;
             {clear_from (3);}
             gotoxy (1,3);
             end;
          write (i:3, ': ');
          dispWords (place^.w);
          if c.l < 66 then
             writeln (place^.range:9:4)
          else writeln;

place := place^.next;
          end;

if place = nil then begin
       gotoxy (1,50);
       write ('Key space to continue...');
       ch := readkey;
       end;
end;

procedure delete (g: genome_ptr);
{*********************************************************************}
{* delete g from the list it is in
{*********************************************************************}
var i: integer;
begin
   if g^.prev = nil then begin     {g is first in list}
      if g^.next <> nil then g^.next^.prev := nil;
      `pop_list := g^.next;
      end
   else
      if g^.next = nil then begin  {g is last in list}
         g^.prev^.next := nil;
         pop_list_tail := g^.prev
         end
      else begin                   {g is in middle of list}
         g^.prev^.next := g^.next;
         g^.next^.prev := g^.prev;
         end;

{ adjust the eval total } c.eval_sum := c.eval_sum - g^.range;

{adjust population count} dec (c.current_m);

dispose_genome (g);
end;

procedure insert (g: genome_ptr);
{*********************************************************************}
{*
{*********************************************************************}
label 11;
var done: boolean;
    place: genome_ptr;
    i: word;

function place_before_value (place, value: extended): boolean;
    {*********************************************************************}
    {*
    {*********************************************************************} begin
      if p.maximizing then
         place_before_value := place < value
      else
         place_before_value := place >= value
    end;
```

```
begin

{search for insertion point} done := false;

if pop_list = nil then begin {list is empty}
      pop_list := g;
      pop_list_tail := g;
      g^.prev := nil;
      g^.next := nil;
      done := true;
      goto l1;
      end;

place := pop_list;
  while place <> nil do begin if place_before_value (place^.range, g^.range) then begin {insert before place} if place^.prev = nil then begin {insertion point is front of list}
            pop_list^.prev := g;
            g^.next := pop_list;
            g^.prev := nil;
            pop_list := g;
            end
        else begin
            place^.prev^.next := g;
            g^.prev := place^.prev;
            g^.next := place;
            place^.prev := g;
            end;
        done := true;
        goto l1;
        end;
    place := place^.next;
    end;
l1:
  if not done then begin   {insert g at end of list}
      pop_list_tail^.next := g;
      g^.prev := pop_list_tail;
      g^.next := nil;
      pop_list_tail := g;
      end;

{ adjust the eval total } c.eval_sum := c.eval_sum + g^.range;

{adjust the population count} inc (c.current_m);
end;

procedure remove_pop;
{*****************************************************************************}
{*
{*****************************************************************************}
begin
  while pop_list <> nil do begin
      delete (pop_list);
      disp_mem;
      end;
  pop_initted := false;
  c.current_m := 0;
end;

procedure align_genome (g: genome_ptr);
{*****************************************************************************}
{* cause the genome to start at a certain place.
{*****************************************************************************}
label l1;
var w1: wordstring;
    i,j,index: word;
```

```
begin
  {find 1} for i := 1 to c.l do begin
      if g^.w[i] = 1 then goto l1;
      end;

write (#7, 'Error in align_genome');
  halt;

l1:

with g^ do begin
      index := 1;
      for j := i to c.l do begin
          wl[index] := w[j];
          inc (index);
          end;
      for j := 1 to i-1 do begin
          wl[index] := w[j];
          inc (index);
          end;
      w := wl;
      end;
end;

procedure random_pop;
{***********************************************************************}
{* create a random population, stopping if luck solves the problem
{***********************************************************************}
var i: word;
    g,last_g: genome_ptr;
    ch: char;
    sum: longint;
begin
  if pop_initted then remove_pop;

{if tsp_map = nil then
     make_random_map (tsp_map, c.l);} pop_list := nil;
  pop_list_tail := nil;
  c.eval_sum := 0.0;

pop_initted := true;

for i := 1 to c.m do begin
      g := new_genome;
      random_wordstring (g^.w);
      eval(g);
      if p.align then align_genome (g);
      insert (g);
      if p.logging then
          update_log (pop_list^.range, function_solved (pop_list));
      disp_mem;
      trial_done := function_solved (g);
      if trial_done then exit;
      end;
end;

function dup_check (g: genome_ptr;
                    cnt: word): boolean;
{***********************************************************************}
{* return true if there are no dups
{***********************************************************************}
var place: genome_ptr;
begin
  place := pop_list;
  if p.align then align_genome (g);
  while place <> nil do begin
      if word_equalp (place^.w, g^.w, cnt) then begin
          dup_check := false;
          inc (c.d);
```

```
      exit;
      end;
    place := place^.next;
    end;
  dup_check := true;
end;

function select_good_one_by_fitness: genome_ptr;
{****************************************************************}
{* Choose a good one based on the the value of the genomes. The calculation
{* is normalized by the lowest valued genome.
{****************************************************************}
label l1;
var place: genome_ptr;
    adjusted_eval_sum, base, sum, target: realnum;
    i: word;
begin {Compute the area over which to select.} if p.maximizing then begin
     base := pop_list_tail^.range - 1;
     adjusted_eval_sum := c.eval_sum-(base*c.m)
     end
  else begin
     base := pop_list_tail^.range + 1;
     adjusted_eval_sum := (c.m * pop_list_tail^.range) - c.eval_sum +
                          c.m * 1;
     end;

target := adjusted_eval_sum * random;

sum := 0;
  i := 0;
  place := pop_list;
  while place <> nil do begin
     inc (i);
     if p.maximizing then begin
        sum := sum + place^.range - base;
        end
     else begin
        sum := sum + base - place^.range;
        end;
     if sum >= target then goto l1;
     place := place^.next;
     end;

l1:
  if place <> nil then
     select_good_one_by_fitness := place
  else begin
     select_good_one_by_fitness := pop_list_tail;
     end;
end;

function summation (n: word): word;
{****************************************************************}
{* Quickly returns the sum from 1 to n
{****************************************************************}
var n_2: word;
begin
  n_2 := n div 2;
  if odd (n) then
     summation := (n + 1) * n_2 + (n_2 + 1)
  else
     summation := (n + 1) * n_2;
end;

function select_bad_one_exponentially: genome_ptr;
{****************************************************************}
{*
{****************************************************************}
var place: genome_ptr;
    n,i: word;
    delete_prob: realnum;
```

```
begin
  delete_prob := c.delete_prob[c.m - p.m];

place := pop_list_tail;
  while place <> nil do begin
     if random > delete_prob then begin
        select_bad_one_exponentially := place;
        exit;
        end;
     place := place^.prev;
     end;

select_bad_one_exponentially := pop_list;
end;

function select_bad_one_randomly_with_elitism: genome_ptr;
{*******************************************************************}
{* random from the population except first                          *}
{*******************************************************************}
var place: genome_ptr;
    n,i: word;
    cutoff: realnum;
begin
  n := random (c.current_m-1)+1;

place := pop_list;
  for i := 1 to n do
    place := place^.next;

select_bad_one_randomly_with_elitism := place;
end;

begin
  pop_list := nil;
  pop_list_tail := nil;
  pop_initted := false;
end.

unit ga_sched;

INTERFACE uses ga_global;

function eval_sched (g: genome_ptr;
                last: word): realnum;
procedure calc_sched_max;
procedure show_the_sched (start_x, start_y: word);
procedure show_task_list (ws: wordstring;
                    x,y: word);
procedure random_task_list;
function  sched_mutate_insert (p1, dummy2, c1, dummy4: genome_ptr): boolean;
function  sched_mutate_swap (p1, dummy2, c1, dummy4: genome_ptr): boolean;
function  sched_mutate_random (p1, dummy2, c1, dummy4: genome_ptr): boolean;
function  sched_mutate_scramble (p1, dummy2, c1, dummy4: genome_ptr): boolean;
procedure sched_cross_order (p1, p2, c1, c2: genome_ptr;
                    var c1_ok, c2_ok: boolean);
procedure sched_cross_place (p1, p2, c1, c2: genome_ptr;
                    var c1_ok, c2_ok: boolean);
{$IFDEF whitley}
procedure sched_cross_edge (p1, p2, c1: genome_ptr;
                    var c1_ok: boolean);
{$ENDIF}
procedure init_sched;
procedure build_schedule (var ws: wordstring;
                    last_task: word);

const min_res = 0; {size of the scheduling problem}
      max_res = 29;
      min_time = 0;
      max_time = 100;

max_tasks = max_wordstring_size; {max number of tasks allowed in task list
```

```
type
    task_ptr = ^task_rec;
    task_rec = record
        id: char; {display char}
        res_needed: array [min_res..max_res] of byte; {number of each resource n
        time_needed: word; {number of hours needed in sched}
        priority: word; {1-99, where 99 is highest}
        next: task_ptr; {used to chain tasks} {currently not used}
        in_sched: boolean; {if true, task has been placed in the schedule}
        where_in_sched: word; {starting hour in schedule}
        end;

sched_entry = record
        cnt: word; {number available. For now, allow 1 and 0 allowed}
        tasks: task_ptr; {the list of tasks scheduled here. For now, only one}
        end;

sched_type = array [min_time..max_time, min_res..max_res] of sched_entry;

var task_list: array [1..max_wordstring_size] of task_ptr; {the list of tasks to
    the_sched: sched_type; {the last schedule evaluated}
    num_tasks_scheduled: word; {number of tasks placed into the schedule}

IMPLEMENTATION.
uses crt, ga_param, ga_bits;

var priority_sum: word; {sum of all task priorities. Used to evaluate sched} procedure calc_sched_max;
{***************************************************************}
{*
{***************************************************************}
begin
    {calc_sched_max := priority_sum * 2;}
end;

procedure show_the_sched (start_x, start_y: word);
{***************************************************************}
{* display the schedule at start_x, start_y
{***************************************************************}
var h,r: word;
begin
    for h := min_time to p.sched_hours do begin
        gotoxy (start_x, start_y + h);
        write (h:2, ' ');
        for r := min_res to max_res do begin
            if the_sched[h,r].cnt = 0 then
                write (the_sched[h,r].tasks^.id)
            else
                write (#250);
            end;
        end;
    gotoxy (start_x, wherey+1);
    write ('Tasks scheduled = ', num_tasks_scheduled:1);
end;

function new_random_task: task_ptr;
{***************************************************************}
{* Create a random task
{***************************************************************}
var t: task_ptr;
    i: word;
begin
    new (t);
    for i := min_res to max_res do begin
        if random > 0.75 then
            t^.res_needed[i] := 1
        else
            t^.res_needed[i] := 0;
        end;
    t^.priority := random (100);
    t^.time_needed := random (3) + 1;
    t^.next := nil;
    t^.in_sched := false;

new_random_task := t;
end;
```

```pascal
procedure sort_task_list;
{***************************************************************}
{* sort the task list into priority order
{***************************************************************}
var i, j: word;
    t: task_ptr;
begin
  for i := 1 to c.l-1 do begin
    for j := i+1 to c.l do begin
      if task_list[i]^.priority < task_list[j]^.priority then begin
        t := task_list[i];
        task_list[i] := task_list[j];
        task_list[j] := t;
        end;
      end;
    end;
end;

procedure random_task_list;
{***************************************************************}
{* Create a random task list
{***************************************************************}
var i: word;
begin
  randseed := 123456; {seeded to allow working with the same problem}
  priority_sum := 0;
  for i := 1 to max_tasks do
    if task_list[i] <> nil then
      dispose (task_list[i]);
  for i := 1 to c.l do begin
    task_list[i] := new_random_task;
    with task_list[i]^ do begin
      inc (priority_sum, priority);
      if i < 27 then
        id := chr (i+96)
      else
        if i < 53 then
          id := chr (i - 26 + 64)
        else
          if i < 93 then
            id := chr (i - 52 + 127); {good for 92 tasks}
      end;
    end;
  sort_task_list;
  randomize;
end;

procedure init_task_list;
{***************************************************************}
{* clear flags in the task list
{***************************************************************}
var i: word;
begin
  for i := 1 to c.l do
    task_list[i]^.in_sched := false;
end;

procedure show_task_list (ws: wordstring;
                          x,y: word);
{***************************************************************}
{* Display the task list at x,y
{***************************************************************}
var i,j,last: word;
begin
  gotoxy (x,y);
  last := c.l;
  if c.l > 40 then last := 40;
  for i := 1 to last do begin
    with task_list[ws[i]]^ do begin
      write (i:3);
      write (id:3);
      write (priority:4);
      write (time_needed:3);
      write (' ');
```

```
          for j := min_res to max_res do begin
             if res_needed[j] = 0 then
                if in_sched
                   then write (chr (254))
                   else write (chr (250))
             else
                write (id);
             end;
          end;
          writeln;
          gotoxy (x, whereY);
       end;
    writeln;
    gotoxy (x, whereY);
    write ('Priority sum = ', priority_sum:1);
end;

procedure build_schedule (var ws: wordstring;
                          last_task: word);
{***************************************************************}
{* Build a schedule from a particular order
{***************************************************************}
label NEXT_TIME, SLOT_FOUND;
var start_time, task, h, hour_cnt, r: word;
    ch: char;
begin num_tasks_scheduled := 0;

{loop through entire task list in ws order} for task := 1 to last_task do begin
      with task_list[ws[task]]^ do begin

{try find a place to insert into the schedule} hour_cnt := 0; {task must match for needed number of hours}
         for h := min_time to p.sched_hours do begin
            for r := min_res to max_res do begin
               if ((res_needed[r] <> 0) and (the_sched [h,r].cnt = 0)) then begin
                  hour_cnt := 0;
                  goto NEXT_TIME;
                  end; {if}
               end; {for r}

{if we make it this far, we have a fit for another time slice} inc (hour_cnt);
            if hour_cnt = time_needed then goto slot_found;
            NEXT_TIME:

end; {for h}

SLOT_FOUND:

if hour_cnt <> time_needed then begin

{no time was found for the current task} end
         else begin

{A time slot was found. Update the schedule} start_time := h - hour_cnt + 1;
            for h := start_time to start_time + time_needed - 1 do
               for r := min_res to max_res do begin
                  if res_needed[r] <> 0 then begin
                     if the_sched[h,r].cnt < 1 then begin
                        clrscr;
                        writeln ('Error in schedule update', #7);
                        halt;
                        end;
                     dec (the_sched[h,r].cnt);
                     the_sched[h,r].tasks := task_list[ws[task]];
                     end;
```

```
            end;
         in_sched := true; {mark the task as scheduled}
         where_in_sched := start_time;
         inc (num_tasks_scheduled);
         end;

end; {with task_list entry} end; {for task} end;

procedure init_sched;
{***************************************************************}
{*
{***************************************************************}
var t,r: word;
begin
   for t := min_time to p.sched_hours do
      for r := min_res to max_res do begin
         the_sched[t,r].cnt := 1;
         the_sched[t,r].tasks := nil;
         end;
end;

function sched_mutate_insert (p1, dummy2, c1, dummy4: genome_ptr): boolean;
{***************************************************************}
{* Pick two places, and move the furthest place before the first place
{***************************************************************}
var first, last, temp, i: word;
begin
   {copy the parent to the child}
   for i := 1 to c.l do
      c1^.w[i] := p1^.w[i];

{select two places}
   repeat
      first := random (c.l) + 1;
      last := random (c.l) + 1;
   until first <> last;
   if first > last then begin
      temp := last;
      last := first;
      first := temp;
      end;

{move the last place to before the first}
   with c1^ do begin
      temp := w[last];
      for i := last downto first+1 do begin
         w[i] := w[i-1];
         end;
      w[first] := temp;
      end;
   sched_mutate_insert := true;
end;

function sched_mutate_swap (p1, dummy2, c1, dummy4: genome_ptr): boolean;
{***************************************************************}
{* Pick two places, and switch places
{***************************************************************}
var first, last, temp, i: word;
begin {copy the parent to the child} for i := 1 to c.l do
      c1^.w[i] := p1^.w[i];

{select two places} repeat
      first := random (c.l) + 1;
      last := random (c.l) + 1;
   until first <> last;
```

```pascal
   {switch places} with c1^ do begin
      temp := w[last];
      w[last] := w[first];
      w[first] := temp;
      end;

sched_mutate_swap := true;
end;

function sched_mutate_random (p1, dummy2, c1, dummy4: genome_ptr): boolean;
{*****************************************************************}
{* Generate a random wordstring
{*****************************************************************}
var first, last, temp, i: word;
begin
   random_wordstring (c1^.w);
   sched_mutate_random := true;
end;

function sched_mutate_scramble (p1, dummy2, c1, dummy4: genome_ptr): boolean;
{*****************************************************************}
{* Scramble a substring of p1
{*****************************************************************}
var first, last, temp, i, r: word;
    offset: word;
begin {copy the parent to the child}
   for i := 1 to c.l do
      c1^.w[i] := p1^.w[i];

{select two places}
   repeat
      first := random (c.l) + 1;
      last := random (c.l) + 1;
   until first <> last;
   if first > last then begin
      temp := last;
      last := first;
      first := temp;
      end;

{scramble from first to last} offset := first - 1;

for i := last downto first+1 do begin
      r := random (i - offset) + offset + 1;
      with c1^ do begin
         temp := w[i];
         w[i] := w[r];
         w[r] := temp;
         end;
      end;
   sched_mutate_scramble := true;
end;

procedure sort (var w: wordstring;
                cnt: word);
{*****************************************************************}
{* Sort the first cnt elements of w
{*****************************************************************}
var i,j,temp: word;
begin
   if cnt < 2 then exit;
   for i := 1 to cnt-1 do
      for j := i+1 to cnt do begin
         if w[j] < w[i] then begin
            temp := w[j];
            w[j] := w[i];
            w[i] := temp;
            end;
```

```
      end;
end;

procedure sched_cross_order (p1, p2, c1, c2: genome_ptr;
                             var c1_ok, c2_ok: boolean);
{************************************************************}
{* sched_cross_order: create a random mask. Impose the order of masked tasks
{*    in one parent on the corresponding tasks in the other parent.
{************************************************************}
var m: array [1..max_wordstring_size] of boolean;
    a1, a2, m1, l1, l2: wordstring;
    i,cnt: word;
begin
  c1_ok := true;
  c2_ok := true;

cnt := 0;
  for i := 1 to c.l do begin
     m[i] := random > 0.5;
     c1^.w[i] := p1^.w[i]; {make a copy of each parent}
     c2^.w[i] := p2^.w[i];
     a1[p1^.w[i]] := i;    {get locations of tasks in each parent}
     a2[p2^.w[i]] := i;
     if m[i] then begin
        inc (cnt);
        m1[cnt] := i;      {save mask locations}
        end;
     end;

for i := 1 to cnt do begin
     l1[i] := a1[p2^.w[m1[i]]]; {get the locations of cells to change in other p
     l2[i] := a2[p1^.w[m1[i]]];
     end;

sort (l1, cnt); {sort them}
  sort (l2, cnt);

for i := 1 to cnt do begin
     c1^.w[l1[i]] := p2^.w[m1[i]];
     c2^.w[l2[i]] := p1^.w[m1[i]];
     end;

end;

procedure sched_cross_place (p1, p2, c1, c2: genome_ptr;
                             var c1_ok, c2_ok: boolean);
{************************************************************}
{* sched_cross_order: create a random mask. Impose the location of masked
{*    tasks in one parent on the corresponding tasks in the other parent.
{************************************************************}
var m, m1, m2: array [1..max_wordstring_size] of boolean;
    a1, a2: wordstring;
    i, i1, i2: word;

procedure makemask_two_point;
    {*****************************************************************
    {*
    {*****************************************************************
    var i,j,k,l: word;
    begin
       j := trunc (random * c.l) + 1;
       k := trunc (random * c.l) + 1;
       if k < j then begin
          l := k;
          k := j;
          j := l;
          end;
       for i := 1 to j-1 do m[i] := false;
       for i := j to k do m[i] := true;
       if k <> c.l then
          for i := k+1 to c.l do m[i] := false;
    end;
```

```
begin
  c1_ok := true;
  c2_ok := true;

for i := 1 to c.l do begin
     m[i] := random > 0.5;  {create the mask}
     a1[p1^.w[i]] := i;     {get locations of masked tasks in each parent}
     a2[p2^.w[i]] := i;
     m1[i] := false;        {clear the child masks}
     m2[i] := false;
     end;

for i := 1 to c.l do begin
     if m[i] then begin
        m1[a1[p2^.w[i]]] := true;
        m2[a2[p1^.w[i]]] := true;
        end;
     end;

i1 := 1;
  i2 := 1;
  for i := 1 to c.l do begin

{update c1}
     if m[i] then
        c1^.w[i] := p2^.w[i]
     else begin
        if m1[i1] then
           repeat inc (i1) until not m1[i1];
        c1^.w[i] := p1^.w[i1];
        inc (i1);
        end;

{update c2}
     if m[i] then
        c2^.w[i] := p1^.w[i]
     else begin
        if m2[i2] then
           repeat inc (i2) until not m2[i2];
        c2^.w[i] := p2^.w[i2];
        inc (i2);
        end;
     end;
end;
{$IFDEF whitley}
procedure sched_cross_edge (p1, p2, c1: genome_ptr;
                            var c1_ok: boolean);
{*****************************************************************}
{* Whitly's edge operator
{*****************************************************************}
var e: array [1..max_wordstring_size, 1..max_wordstring_size] of boolean;
    cnts: array [1..max_wordstring_size] of word;
    free: array [1..max_wordstring_size] of boolean;

a1, a2, m1, l1, l2: wordstring;
    i,j,k,cnt: word;

procedure update_edges (node: word);
    {*****************************************************************}
    {*
    {*****************************************************************}
    var j: word;
    begin
       for j := 1 to c.l do begin
          if e[node,j] then begin
             e[node,j] := false;
             dec (cnts[j]);
             if cnts[j] < 0 then cnts[j] := 0;
             end;
          end;
       free[node] := false;
    end;
```

```
function choose_least: word;
{***************************************************************}
{* Choose the node with the least edges left, or choose randomly from
{* remaining nodes.
{***************************************************************}
var least_cnt: word;
    list: array [1..max_wordstring_size] of word;
    index: word;
    i: word;
begin
  index := 0;
  least_cnt := 9999;
  for i := 1 to c.l do
      if free[i] then
          if cnts[i] = least_cnt then begin
              least_cnt := cnts[i];
              inc (index);
              list[index] := i;
              end
          else if cnts[i] < least_cnt then begin
              least_cnt := cnts[i];
              index := 1;
              list[index] := i;
              end;

if index = 0 then begin
      write (#7);
      halt;
      end;
  choose_least := list[random (index) + 1];

end;

begin
  cl_ok := true;

{zero edge array} for i := 1 to c.l do begin
      cnts[i] := 0;
      free[i] := true;
      for j := 1 to c.l do
          e[i,j] := false;
      end;

{init e} for i := 2 to c.l do begin
      e[p1^.w[i], p1^.w[i-1]] := true;
      e[p1^.w[i-1], p1^.w[i]] := true;
      e[p2^.w[i], p2^.w[i-1]] := true;
      e[p2^.w[i-1], p2^.w[i]] := true;
      end;
  e[p1^.w[1], p1^.w[c.l]] := true; {take care of the ends}
  e[p1^.w[c.l], p1^.w[1]] := true;

{update counts}
  {note: this should (probably) be driven by j, but at this point, the}
  {array is symetrical} for i := 1 to c.l do
      for j := 1 to c.l do
          if e[i,j] then inc (cnts[i]);

{choose the starting point} if random > 0.5 then
      cl^.w[1] := p1^.w[1]
  else
      cl^.w[1] := p2^.w[1];

update_edges (cl^.w[1]);

for i := 2 to c.l do begin {get the rest of the nodes}
      cl^.w[i] := choose_least;
      update_edges (cl^.w[i]);
      end;
```

```
end;

{$ENDIF} function eval_sched (g: genome_ptr;
                     last: word): realnum;
{****************************************************************}
{* Evaluate a schedule
{****************************************************************}
var i: word;
    sum: realnum;
begin
  init_task_list;
  init_sched;
  build_schedule (g^.w, last);

sum := priority_sum; {start with the sum of all priorities} for i := 1 to c.l do begin
     with task_list[i]^ do begin
        if in_sched then begin sum := sum + priority;

{upper case tasks want to be in the afternoon} if id <= 'Z' then begin
              if where_in_sched < 12 then sum := sum - priority/2;
              end;
           end
        else begin
           sum := sum - priority;
           end;
        end;
     end;
  eval_sched := sum;
end;

procedure init_sched_prob;
{****************************************************************}
{* Nil the task list.
{****************************************************************}
var i, t, r: word;
begin
  for i := 1 to max_tasks do
     task_list[i] := nil;
  priority_sum := 0;
end;

begin
  init_sched_prob;
end.
{$V-} unit files;

INTERFACE uses dos, misc, time;

function FileExist (FileName: str30): boolean;
procedure FileInfo (FileSpec: str80;
                    var FileBytes: real;
                    var d: date_def;
                    var t: time_def;
                    var attrList: str30);
procedure DiskSpace (var error: boolean;
                     drive: integer;
                     var bytesCluster, clustersCap, clustersFree: integer);
```

IMPLEMENTATION

```pascal
function FileExist (FileName: str30): boolean};
{***********************************************************}
{* FileExist: checks for existence of file.
{***********************************************************}
var f: file;
begin
  assign (f, FileName);
  {$I-}
  reset (f);
  close (f);
  FileExist := (IOresult = 0);
  {$I+}
end;

{****************************************************************}
{* These routines deal with DOS files. Most are taken from the
{* book "Turbo Pascal Program Library" by Rugg Feldman.
{*
{* Last revised: 3/4/87
{****************************************************************} procedure FileInfo {FileSpec: str80;
                    var FileBytes: real;
                    var d: date_def;
                    var t: time_def;
                    var attrList: str30};
type filedata = record
       reserved: array [1..21] of byte;
       attr: byte;
       time, date, sizelo, sizehi: integer;
     end;

var reg: registers;
    dta: array [1..43] of byte;
    fd:  filedata absolute dta;

begin
  reg.dx := ofs(dta);
  reg.ds := seg(dta);
  reg.ax := $1a00;
  msdos (reg);
  filespec := filespec + chr(0);
  reg.dx := ofs (filespec[1]);
  reg.ds := seg (filespec[1]);
  reg.cx := $16;
  reg.ax := $4e00;
  msdos (reg);
  if lo(reg.ax) <> 0 then begin
     filebytes := -1.0;
     exit;
     end;
  fileBytes := lo(fd.sizelo) + 256.0 * hi (fd.sizelo) +
               65536.0 * lo (fd.sizehi) +
               16777216.0 * hi (fd.sizehi);
  d.year := (hi(fd.date) shr 1) + 80;
  if d.year > 99 then d.year := d.year - 100;
  d.month := lo(fd.date) shr 5 + (hi(fd.date) and $01 shl 3);
  d.day := lo(fd.date) and $1f;

t.hour := hi(fd.time) shr 3;
  t.minute := lo(fd.time) shr 5 + (hi(fd.time) and $07 shl 3);
  t.second := (lo(fd.time) and $1f) shl 1;

attrlist := '      ';
  if fd.attr and $20 = $20 then AttrList[1] := 'A';
  if fd.attr and $10 = $10 then AttrList[2] := 'D';
  if fd.attr and $02 = $02 then AttrList[3] := 'H';
  if fd.attr and $01 = $01 then AttrList[4] := 'R';
  if fd.attr and $04 = $04 then AttrList[5] := 'S';
end;

procedure DiskSpace {var error: boolean;
                     drive: integer;
                     var bytesCluster, clustersCap, clustersFree: integer};
```

```pascal
{****************************************************************}
{* DispSpace: determine the amount of space on a disk. Drive 0 is
{*     the default, drive 1 is A, etc.
{****************************************************************}
var reg: registers;
begin
  reg.dx := drive;
  reg.ax := $3600;
  msdos (reg);
  if reg.ax = $FFFF then begin
      error := true;
      clustersFree := -1;
      bytesCluster := -1;
      clustersCap := -1;
      end
   else begin
      error := false;
      bytesCluster := reg.ax * reg.cx;
      clustersFree := reg.bx;
      clustersCap  := reg.dx;
      end;
end;

begin
end.
    unit gchar;

{ Author: Gilbert Syswerda

Revised: 7/9/86 by Gil
       Revised: 7/9/86 by Gil to add polled_process to GetChar
       Revised: 6/16/87 by Gilbert to add speed cnt to GetChar
       Revised: 11/11/87 by Gil to convert to 4.0
  Last revised: 01/24/88 by Gil to add polled_process back by way of interupts Language: Turbo Pascal 4.0
}

INTERFACE uses crt, dos, tick;

const home  = #71;
      PgUp  = #73;
      end_key = #79;
      PgDn  = #81;
      c_home = #119;
      c_PgUp = #132;
      c_end_key = #117;
      c_PgDn = #118;

up_arrow    = #72;
      down_arrow  = #80;
      left_arrow  = #75;
      right_arrow = #77;
      c_left_arrow  = #115;
      c_right_arrow = #116;

ins_key = #82;
      del_key = #83;
      esc_key = #27;
      cr_key  = #13;
      space_key = #32;
      bs_key  = #8;

var gch_sync: word; {equals the max count returned by sync_getchar}
      gch_speed: word; {equals the count returned by the last GetChar}
      AltChar: boolean;

procedure reset_polled_process;
  procedure assign_polled_process (p: pointer);
  function getchar: char;
  function sync_getchar: word;
```

IMPLEMENTATION

```
const getchar_int = 203;

var old_p: pointer; {pointer to whatever was at interrupt getchar_int} function getchar {: char};
{*******************************************************}
{* getchar: read a character from the keyboard. If an Alt'ed
{*   character is read, set AltChar true. If one tick has
{*   elasped, call forward to polled_process.
{*******************************************************}
var a_tick: word;
    ch: char;
    r: registers;
begin
  a_tick := GetTick;
  gch_speed := 0;
  repeat
     inc (gch_speed);

if keypressed then begin
        ch := readkey;
        if ch = #0 then begin
           ch := readkey;
           AltChar := true;
           end
        else
           AltChar := false;
        getchar := ch;
        exit;
        end {if}
     else begin {check to see if the polled process should be called}
        if SinceTick (a_tick, 1) then begin
           intr (getchar_int, r);
           gch_speed := 0;
           end;
        end; {else}
  until false;
end;

function sync_getchar {: word };
{*******************************************************}
{* sync_getchar: this routine calculates approximately how often getchar
{*   cycles in one tick. This allows you to calculate how much
{*   CPU time is being used by other routines running concurrently.
{*******************************************************}
var a_tick, b_tick: word;
    count: word;
    ch: char;
    r: registers;
begin { clear the keyboard buffer } if keypressed then repeat ch := readkey until not keypressed;

{ sync to beginning of a tick } b_tick := GetTick;
  repeat
     a_tick := GetTick;
  until a_tick <> b_tick;

count := 0;
  repeat
     inc (count);
     if keypressed then begin
     {Keyboard should not be hit during the sync calculation. If it is,
     {start the calculation over } repeat ch := readkey until not keypressed;
     count := 0;
     b tick := GetTick;
```

```
            repeat
                a_tick := GetTick;
            until a_tick <> b_tick;
            end
        else begin { do whatever it is that getchar does when no key is hit } if SinceTick (a_tick, 1) then begin
                sync_getchar := count;
                exit;
                end;
            end; {else}
    until false;
end;

procedure dummy; interrupt;
{***********************************************************}
{* dummy: this exists to do nothing when getchar calls int 243;
{***********************************************************}
begin
end;

procedure reset_polled_process;
{***********************************************************}
{* reset_polled_process: set interrupt getchar_int back to the original.
{*    This should be called at the end of every program, although it
{*    probably does not matter if the interrupt getchar_int is not used.
{***********************************************************}
begin
    SetIntVec (getchar_int, old_p);
end;

procedure assign_polled_process {p: pointer};
{***********************************************************}
{* assign_polled_process: assign the polled process to p
{***********************************************************}
begin
    reset_polled_process;
    GetIntVec (getchar_int, old_p);
    SetIntVec (getchar_int, p);
end;

begin
    gch_sync := sync_getchar;
    assign_polled_process (@dummy);
end.

unit get;
{***********************************************************}
{* UNIT GET: contains routines that get values from the user.
{***********************************************************}

INTERFACE uses misc, crt, gchar;

procedure get_int (var val: integer;
                   with_default: boolean);

procedure get_word (var val: word;
                    with_default: boolean);

procedure get_real (var r: real;
                    var error: boolean);
procedure get_key (var ch: char;
                   char_set: charset);
procedure getstr (var s: str255; l: integer; caps, default: boolean);

IMPLEMENTATION procedure get_int {var val: integer;
                   with_default: boolean};
```

```
{***************************************************************}
{* get_int: get an integer value with optional default
{***************************************************************}
    var ch: char;
        count: integer;
        done: boolean;
        placeX: integer;
    label jump;

begin
      count := 0;
      done := false;

if with_default then begin
         placeX := whereX;
         write (val);
         ch := readkey;
         if ord (ch) = 13 then begin
            writeln;
            exit;
            end;
         gotoxy (placeX,whereY);
         write ('      ');
         gotoxy (placeX,whereY);
         val := 0;
         goto jump;
         end;

val := 0;

repeat
         ch := readkey;
jump:    if ch in ['1', '2', '3', '4', '5', '6', '7', '8', '9', '0'] then begin
            if val * 10 + (ord (ch)-48) < 0 then begin
               sound (440);
               delay (50);
               nosound;
               end
            else begin
               write (ch);
               count := count+1;
               val := val * 10 + (ord (ch)-48)
               end;
            end
         else
            if ((ord (ch) = 8) and (count > 0)) then begin
               write (ch);
               write (' ');
               write (ch);
               count := count-1;
               val := val div 10;
               end
            else
               if ord(ch) = 13 then
                  done := true
               else begin
                  sound (440);
                  delay (50);
                  nosound;
                  end
      until done;
      if count = 0 then write ('0');
      writeln;
   end;

procedure get_word {var val: word;
                    with_default: boolean};
{***************************************************************}
{* get_int: get an integer value with optional default
{***************************************************************}
    var ch: char;
        count: integer;
        done: boolean;
        placeX: integer;
    label jump;
```

```
   begin
      count := 0;
      done := false;

if with_default then begin
         placeX := whereX;
         write (val);
         ch := readkey;
         if ord (ch) = 13 then begin
            writeln;
            exit;
            end;
         gotoxy (placeX,whereY);
         write ('        ');
         gotoxy (placeX,whereY);
         val := 0;
         goto jump;
         end;
      val := 0;

repeat
         ch := readkey;
jump:    if ch in ['1', '2', '3', '4', '5', '6', '7', '8', '9', '0'] then begin
            if val * 10 + (ord (ch)-48) < 0 then begin
               sound (440);
               delay (50);
               nosound;
               end
            else begin
               write (ch);
               count := count+1;
               val := val * 10 + (ord (ch)-48)
               end;
            end
         else
            if ((ord (ch) = 8) and (count > 0)) then begin
               write (ch);
               write (' ');
               write (ch);
               count := count-1;
               val := val div 10;
               end
            else
               if ord(ch) = 13 then
                  done := true
               else begin
                  sound (440);
                  delay (50);
                  nosound;
                  end
      until done;
      if count = 0 then write ('0');
      writeln;
   end;

procedure get_real {var r: real;
                    var error: boolean};
{****************************************************************}
{* get_real
{****************************************************************}
var s: str80;
    code: integer;
begin
   error := false;
   readln (s);
   val (s, r, code);
   if code <> 0 then error := true;
end;

procedure get_key {var ch: char;
                   char_set: char_set};
{****************************************************************}
{* get_key: get a key from the char_set
{****************************************************************}
var OK: boolean;
begin
   OK := false;
```

```
  repeat
    ch := readkey;
    if ch in char_set then ok := true;
    if not OK then begin
       sound (440);
       delay (50);
       nosound;
       end;
    until OK;
    write (ch);
end;

procedure getstr (var s: str255; l: integer; caps, default: boolean);
{*****************************************************************}
{* getstr: accept a string from the user. l is the length of the string
{*         to be entered, caps indicates that only upper case be entered,
{*         and default indicates a default values is being passed in s.
{*****************************************************************}
var i, pos, max_length: integer;
    ch: char;
    done: boolean;
    placeX: integer;

procedure clear_field (x, l: integer);
    {*****************************************************************}
    {* clear_field: clear the displayed entry area.
    {*****************************************************************}
    var i: integer;
    begin
       gotoxy (x, wherey);
       for i := x to x+l-1 do begin
          write (' ');
          end;
       gotoxy (x, whereY);
    end;

procedure do_beep;
    {*****************************************************************}
    {* do_beep: yet another beep routine
    {*****************************************************************}
    begin
      sound (1000);
      delay (20);
      nosound;
    end;

procedure do_backspace;
    {*****************************************************************}
    {* do_backspace: perform the backspace function
    {*****************************************************************}
    var place: integer;
    begin
      if pos <= 1 then begin
         do_beep;
         exit;
         end;
      place := whereX;
      gotoxy (place - 1, whereY);
      write (' ');
      gotoxy (place - 1, whereY);
      pos := pos - 1;
      s := copy (s, 1, pos-1);
    end;

procedure clear_str;
    {*****************************************************************}
    {* clear_str: clear the entry string
    {*****************************************************************}
    begin
       pos := 1;
       s := '';
       clear_field (placeX, l);
    end;
```

```
begin
  placeX := whereX;
  max_length := 80 - whereX + 1;
  if l > max_length then l := max_length;
  if l < 1 then begin
    s := '';
    exit;
  end;

if default then begin
    if (length (s) > l) then s := copy (s, 1, l);
    if caps then
      for i := 1 to length (s) do
        s[i] := Upcase (s[i]);
    pos := length (s) + 1;
    write (s);
  end
  else begin
    s := '';
    pos := 1;
  end;

done := false;
  repeat
    ch := getchar;

if AltChar then begin
      case ch of
        left_arrow: do_backspace;
        home: clear_str;
        else do_beep;
      end; {case}
    end
    else begin
      case ch of
        bs_key: do_backspace;
        cr_key: done := true;
        esc_key: clear_str;
        #32..#126: begin
          if pos > l then begin
            do_beep;
          end
          else begin
            if caps then ch := upcase (ch);
            write (ch);
            s := s + ch;
            pos := pos + 1;
          end;
        end;
      end; {case}
    end;

until done;
end;

begin
end.

{$V-}
unit menu;

INTERFACE uses crt, misc, gchar, showfast, tick;

const max_menu_choices = 15;

type choice_rec = record
       name: str30;
       desc: str80;
       pos, len: integer;
       char_set: CharSet;
       return_code: integer;
     end;
  choice_ptr = ^choice_rec;
```

```
   menu_rec = record
      name: str30;
      disp_line: str80;
      num_choices: integer;
      possible_chars: set of char;
      last_place: integer;
      current_choice: integer;
      choice: array [1..max_menu_choices] of choice_ptr;
      end;

menu_ptr = ^menu_rec;

var blank_tick: word; {used by the optional screen blanking routines in blank.in function new_menu (a_name: str30): menu_ptr;
procedure add_choice (a_menu: menu_ptr;
                      a_name: str30;
                      a_desc: str80;
                      a_char_set: CharSet;
                      a_code: integer);
procedure finish_menu (a_menu: menu_ptr);
function get_choice (a_menu: menu_ptr): integer;
function menu_list (s: string): word;

IMPLEMENTATION function new_menu { (a_name: str30): menu_ptr};
{********************************************************************}
{* new_menu: define a new menu and return a pointer to the newly
{*    created menu structure.
{********************************************************************}
var a_menu: menu_ptr;
    i: integer;
begin
  new (a_menu);
  with a_menu^ do begin
     name := a_name + ': ';
     disp_line := name;
     last_place := length (a_name) + 1;
     num_choices := 0;
     possible_chars := [];
     current_choice := 1;
     for i := 1 to max_menu_choices do
        choice[i] := nil;
     end;
  new_menu := a_menu;
end;

procedure add_choice {a_menu: menu_ptr;
                      a_name: str30;
                      a_desc: str80;
                      a_char_set: CharSet;
                      a_code: integer};
{********************************************************************}
{* add_choice: add a choice to a_menu. a_name is the displayed name
{*    of the choice, a_desc is a description of the choice, a_char_set
{*    is the set of characters that will select the choice, and a_code
{*    is the value that is returned when the choice is made.
{********************************************************************}
var i: integer;
begin
  with a_menu^ do begin
     num_choices := num_choices + 1;
     new (choice[num_choices]);
     possible_chars := possible_chars + a_char_set;
     if num_choices <> 1 then
        disp_line := disp_line + ' ';
     disp_line := disp_line + a_name;
     with choice[num_choices]^ do begin
        name := a_name;
        desc := a_desc;
        for i := length (desc) to 80 do
           desc := desc + ' ';
        char_set := a_char_set;
        return_code := a_code;
```

```
            pos := last_place + 2;
            len := length (name);
            last_place := pos + len;
            end;
         end;
   end;

procedure finish_menu (a_menu: menu_ptr};
{****************************************************************}
{* finish_menu: finish the definition of a menu.
{****************************************************************}
var i,j: integer;
begin
   with a_menu^ do begin
      i := length (disp_line);
      for j := i to 80 do
         disp_line := disp_line + ' ';
   end;
end;

{
     The remainder of the routines are display routines
} procedure new_choice (a_menu: menu_ptr;
                      choice: integer);
{****************************************************************}

{* new_choice
{****************************************************************}
begin
   with a_menu^.choice[a_menu^.current_choice]^ do begin
      SetField (false, false, false, pos, 1, length (name));
      end;
   with a_menu^.choice[choice]^ do begin
      SetField (true, false, false, pos, 1, length (name));
      end;
   a_menu^.current_choice := choice;
   faststr (a_menu^.choice[choice]^.desc,1,2);
end;

procedure set_choice (a_menu: menu_ptr);
{****************************************************************}
{* set_choice: clear the menu except for the current selection.
{****************************************************************}
begin
   gotoxy (1,1);
   clreol;
   faststr (a_menu^.name, 1, 1);
   with a_menu^.choice[a_menu^.current_choice]^ do begin
      faststr (name, pos, 1);
      SetField (true, false, false, pos, 1, length (name));
      end;
end;

procedure next_choice (a_menu: menu_ptr);
{****************************************************************}
{* next_choice
{****************************************************************}
var i: integer;
begin
   with a_menu^ do begin
      i := current_choice + 1;
      if i > num_choices then i := 1;
      new_choice (a_menu, i);
      end;
end;

procedure prev_choice (a_menu: menu_ptr);
{****************************************************************}
{* prev_choice
{****************************************************************}
var i: integer;
begin
   with a_menu^ do begin
      i := current_choice - 1;
```

```
            if i < 1 then i := num_choices;
            new_choice (a_menu, i);
            end;
   end;

procedure disp_menu (a_menu: menu_ptr);
   {*****************************************************}
   {* disp_menu:
   {*****************************************************}
   begin
      lowVideo;
      with a_menu^ do begin
         SetField (false, false, false, 1,1,80);
         faststr (a_menu^.disp_line,1,1);
         SetField (true, false, false, 1,2,80);
         new_choice (a_menu, a_menu^.current_choice);
         end;
   end;

function get_choice (a_menu: menu_ptr): integer};
   {*****************************************************}
   {* get_choice: display the passed menu, receive a choice, and
   {*    return the resulting code.
   {*****************************************************}
   var ch: char;
       i: integer;
   begin
      cursorOff;
      disp_menu (a_menu);
      blank_tick := GetTick;

repeat
         ch := getchar;
         blank_tick := GetTick;

if AltChar then begin
            case ch of
               right_arrow: next_choice (a_menu);
               left_arrow: prev_choice (a_menu);
               home: new_choice (a_menu, 1);
               end_key: new_choice (a_menu, a_menu^.num_choices);
               else begin
                  sound (440);
                  delay (75);
                  nosound;
                  end;
               end; {case}
            end {if then}
         else begin {normal key was hit}
            if ch in a_menu^.possible_chars then begin
               for i := 1 to a_menu^.num_choices do begin
                  if ch in a_menu^.choice[i]^.char_set then begin
                     new_choice (a_menu,i);
                     set_choice (a_menu);
                     get_choice := a_menu^.choice[i]^.return_code;
                     cursorOn;
                     exit;
                     end;
                  end; {for}
               writeln;
               writeln ('Error: missed choice in proc GET_CHOICE: modual MENU');
               halt;
               end {if then}
            else begin
               case ch of
                  cr_key: begin
                     get_choice := a_menu^.choice[a_menu^.current_choice]^.return_co
                     set_choice (a_menu);
                     cursorOn;
                     exit;
                     end;
                  esc_key: begin
                     get_choice := 0;
                     set_choice (a_menu);
                     cursorOn;
                     exit;
                     end;
```

```pascal
                     space_key: next_choice (a_menu);
                 else begin
                      sound (440);
                      delay (75);
                      nosound;
                      end;
                 end; {case}
             end; {else}
         end; {else}
    until false;
end;

function menu_list (s: string): word;
{*****************************************************}
{* menu_list ('Choice a|Choice B|etc')                *}
{*****************************************************}
const blanks = '                                        ';
var done: boolean;
    sub_s: string;
    p: word;
    max_length, cnt: word;
    placeX, placeY, y: word;
    ch: char;
    i: word;
begin
  done := false;
  cnt := 0;
  max_length := 0;
  placeX := whereX + 2;
  placeY := whereY;
  y := whereY;

while length (s) <> 0 do begin
      inc (cnt);
      p := pos ('|', s);
      if p = 0 then begin
           sub_s := s;
           s := '';
           end
      else begin
           sub_s := copy (s, 1, p-1);
           delete (s, 1, p)
           end;

if length (sub_s) > max_length then max_length := length (sub_s);

gotoxy (placeX, y);
      write (chr (cnt+96), '. ', sub_s);
      inc (y);
      end;

gotoxy (placeX-2, placeY);
  done := false;
  repeat
     ch := readkey;
     done := (((ord (ch) > ord ('a')-1) and (ord (ch) < ord ('a')+cnt)) or
              ((ord (ch) > ord ('A')-1) and (ord (ch) < ord ('A')+cnt)));
     if not done then begin
         sound (1000);
         delay (100);
         nosound;
         end;
  until done;

if ch >= 'a' then
     menu_list := ord (ch) - ord ('a') + 1
  else
     menu_list := ord (ch) - ord ('A') + 1;

sub_s := blanks;
  sub_s[0] := chr(max_length+3);
  y := placeY;
  for i := 1 to cnt do begin
     gotoxy (placeX, y);
     write (sub_s);
```

```
      inc (y);
    end;
  gotoxy (placeX-2, placeY);
  writeln (ch);
  gotoxy (placeX-2, placeY);
end;

{ This set of routines implements Lotus-like menus. The
  menus are kept in records pointed to by a menu_ptr. All info needed to
  present a menu is kept in the menu record.

This module uses the modules misctype, keydef, getchar, and showfast.

Written by Gilbert Syswerda

Last revised: 06/08/87 by Gilbert to add hooks for a screen blanker

The routines are:

new_menu (name) -> menu_ptr  - creates a new menu record
  procedure add_choice (a_menu: menu_ptr;   - Add a menu choice
                        a_name: str30;
                        a_desc: str80;
                        a_char_set: CharSet;
                        a_code: integer);
  procedure finish_menu (a_menu)  - finish adding choices
  procedure new_choice (a_menu, choice)  - highlight a new menu selection
  procedure nexchoice (a_menu: menu_ptr);  - move highlight to next choice
  procedure prev_choice (a_menu: menu_ptr);
  procedure disp_menu (a_menu: menu_ptr);  - display the menu
  function get_choice (a_menu: menu_ptr): integer; - display and process the
      menu. This is the general routine to call.

}
begin
end.
     {$O+,F+}
unit misc;

INTERFACE type
    str12 = string[12];
    str14 = string[14];
    str30 = string[30];
    str66 = string[66];
    str80 = string[80];
    str255 = string[255];

reglist = record ax,bx,cx,dx,bp,si,di,ds,es,flags: integer end;

CharSet = set of char;

IMPLEMENTATION begin
end.

unit screen;

INTERFACE uses crt;

procedure beep;
procedure clear_screen;
procedure clear_from (y: integer);
procedure scroll_screen;
procedure scroll_from (y: integer);
procedure not_clear;
procedure key_space;
function yes: boolean;
```

IMPLEMENTATION

```pascal
const is_clear: boolean = true;    {if true, the screen below the menu is clear procedure beep;
{***************************************************************}
{* beep: do a short beep
{***************************************************************}
begin
  sound (440);
  delay (50);
  nosound;
end;

procedure clear_screen;
{***************************************************************}
{* clear_screen: clear the screen below the menu
{***************************************************************}
var i: integer;
begin
  if is_clear then exit;
  for i := 3 to 25 do begin
    gotoxy (1,i);
    ClrEol;
    end;
  is_clear := true;
end;

procedure clear_from {y: integer};
{***************************************************************}
{* clear_screen: clear the screen from y
{***************************************************************}
var i: integer;
begin
  for i := y to 25 do begin
    gotoxy (1,i);
    ClrEol;
    end;
  gotoxy (1,y);
end;

procedure scroll_screen;
{***************************************************************}
{* clear_screen: clear the screen below the menu
{***************************************************************} var i: integer;
begin
  if is_clear then exit;
  gotoxy (1,3);
  for i := 1 to 23 do InsLine;
  is_clear := true;
end;

procedure scroll_from {y: integer};
{***************************************************************}
{* clear_screen: clear the screen from y
{***************************************************************}
var i: integer;
begin
  gotoxy (1,y);
  for i := 1 to 25-y+1 do InsLine;
end;

procedure not_clear;
{***************************************************************}
{* not_clear: set mono screen status to not clear
{***************************************************************}
begin
  is_clear := false;
end;
```

```pascal
procedure key_space;
{*****************************************************************}
{* key_space: pause until a space is keyed.
{*****************************************************************}
var ch: char;
begin
  writeln;
  write ('Key <space> to continue...');
  while keypressed do ch := readkey;
  repeat
    ch := readkey;
    if ch <> ' ' then beep;
  until ch = ' ';
end;

function yes{: boolean};
{*****************************************************************}
{* yes: get a yes or no response to a question
{*****************************************************************}
var ch: char;
begin
  write (' (y/n):');
  repeat
    ch := readkey;
    if not (ch in ['y','n','Y','N']) then beep;
  until ch in ['y','n','Y','N'];
  if ch in ['y','Y'] then
    yes := true
  else
    yes := false;
end;

begin
end.

{$V-}
unit showfast;

INTERFACE uses crt, dos;

procedure FastStr (var message: string;
                   col, row: integer);
procedure FastStrC (message: string;
                    col, row: integer);

procedure FastReal (r: real; width, decimals: integer;
                    col, row: integer);
procedure FastInt (i: integer; width: integer;
                   col, row: integer);
procedure SetField (reverse, intense, blink: boolean;
                    col, row, len: integer);
procedure SetColor (attrib: byte;
                    col, row: integer);
procedure CursorOn;
procedure CursorOff;
procedure invVideo;

IMPLEMENTATION procedure FastStr {var message: str80;
                   col, row: integer};
{*****************************************************************}
{* showfast: display the message on the screen at col and row. The
{*           current display will be used.
{*****************************************************************}
var vidloc, offset: word;
    pointer: byte;
begin
   if ((col > 80) or (row > 25)) then begin
      clrscr;
      writeln;
      writeln ('FastStr error');
      halt;
      end;
```

```pascal
    if mem[0:$449] = 7
       then VidLoc := $b000
       else VidLoc := $b800;
    offset := (row-1) * 80 + col - 1;
    offset := offset + offset;
    for pointer := 1 to length(message) do
       mem[vidloc:(offset + pointer + pointer - 2)] := ord(message[pointer]);
end;

procedure FastStrC;
{***********************************************************}
{* showfast: display the message (which can be a constant) on the
{*           screen at col and row. The current display will be used.
{***********************************************************}
begin
  FastStr (message, col, row);
end;

procedure FastReal (r: real; width, decimals: integer;
                    col, row: integer);
{***********************************************************}
{* FastReal: display r in a field of width characters with decimal
{*    places displayed, at col and row.
{***********************************************************}
var strg: string[80];
begin
  str (r:width:decimals, strg);
  FastStr (strg, col, row);
end;

procedure FastInt (i: integer; width: integer;
                   col, row: integer);
{***********************************************************}
{* FastInt: display i at col and row.
{***********************************************************}
var strg: string[80];
begin
  str (i:width, strg);
  FastStr (strg, col, row);
end;

procedure SetColor (attrib: byte;
                    col, row: integer);
{***********************************************************}
{* SetColor: Set the attribute byte for one character.
{***********************************************************}
var vidloc, offset: word;
begin
   if ((col > 80) or (row > 25)) then begin
      clrscr;
      writeln;
      writeln ('SetColor error (', col:1, ',', row:1,')');
      halt;
      end;

if mem[0:$449] = 7
      then VidLoc := $b000
      else VidLoc := $b800;
   offset := (row-1) * 80 + col - 1;
   offset := offset + offset +1;
   mem[vidloc:offset] := attrib;
end;

procedure SetField (reverse, intense, blink: boolean;
                    col, row, len: integer);
{***********************************************************}
{* SetField: set the attribute byte of a field on the mono screen.
{***********************************************************}
var vidloc, offset: word;
    pointer, attrib: byte;
begin
   if reverse
      then attrib := 112
      else attrib := 7;
```

```
    if intense then attrib := attrib + 8;
    if blink then attrib := attrib + 128;

if mem[0:$449] = 7
       then VidLoc := $b000
       else VidLoc := $b800;
    offset := (row-1) * 80 + col - 1;
    offset := offset + offset;
    for pointer := 1 to len do
        mem[vidloc:(offset + pointer + pointer - 1)] := attrib;
end;

procedure CursorOn;
{****************************************************************}
{* CursorOn: turn the cursor on.
{****************************************************************}
var reg: registers;
begin
  if mem[0:$449] = 7
     then reg.cx := $0c0d
     else reg.cx := $0607;
  reg.ax := $0100;
  intr ($10,reg);
end;

procedure CursorOff;
{****************************************************************}
{* CursorOff: turn the cursor off
{****************************************************************}
var reg: registers;
begin
  reg.cx := $2000;
  reg.ax := $0100;
  intr ($10,reg);
end;

procedure invVideo;
{****************************************************************}
{* invVideo: sets things so write statements write in reverse video
{****************************************************************}
begin
  textcolor(0);
  textbackground (7);
end;

begin
end.

unit tick;

{****************************************************************}
{* These routines deal with "ticks", the interrupt driven counter
{* in PC's that ticks 18.2 times per second.
{*
{* memw[$0040:$006c] = 64k ticks per hour
{* memw[$0040:$006e] = hours
{*
{* Author: Gilbert Syswerda
{*
{*      Revised: 1/10/87
{* Last revised: 2/10/87 to add SinceTick and GetTick.
{****************************************************************}

INTERFACE var t_lastTick: word;

procedure InitTick;
function GetTick: word;
function ElapseTick (num_ticks: word): boolean;
function SinceTick (var t_lastTick: word;
                    num_ticks: word): boolean;
```

IMPLEMENTATION

```
procedure InitTick;
{*****************************************************************}
{* InitTick: inits things for ElapseTick.
{*****************************************************************}
begin
   t_lastTick := memw[$0040:$006c];
end;

function GetTick: word;
{*****************************************************************}
{* GetTick: return the ticks per hour tick.
{*****************************************************************}
begin
  GetTick := memw[$0040:$006c];
end;

function ElapseTick{ (num_ticks: word): boolean };
{*****************************************************************}
{* ElapseTick: returns true if num_ticks have elapsed since the
{*             last set.
{*****************************************************************}
var t_curTick, diff: word;
begin
  t_curTick := memw[$0040:$006c];

if t_curTick >= t_lastTick then
     diff := t_curTick - t_lastTick
  else
     diff := 65536 - (t_lastTick - t_curTick);

if diff >= num_ticks then begin
     InitTick;
     ElapseTick := true;

end
  else
     ElapseTick := false;
end;

function SinceTick { (var t_lastTick: word;
                     num_ticks: word): boolean};
{*****************************************************************}
{* ElapseTick: returns true if num_ticks have elapsed since the
{*             last set.
{*****************************************************************}
var t_curTick, diff: word;
begin
  t_curTick := memw[$0040:$006c];
  if t_lastTick < 0 then
     if t_curTick < 0 then
        diff := t_curTick - t_lastTick
     else
        diff := t_curTick - t_lastTick
  else
     if t_curTick < 0 then
        diff := (32767 - t_lastTick) + (32767 + t_curTick) + 2
     else
        diff := t_curTick - t_lastTick;
  if diff >= num_ticks then begin
     t_lastTick := GetTick;
     SinceTick := true;
     end
  else
     SinceTick := false;
end;

begin
end.
```

```
    unit time;

{****************************************************************}
{* Routines that deal with date and time, independently of the new
{*    TP 4.0 routines.
{*
{*      Revised: 7/7/87 to add Julian functions
{* Last revised: 11/16/87 to convert to TP 4.0.
{****************************************************************}

INTERFACE uses dos, misc;

type date_def = record
        month, day, year: integer;
        end;

time_def = record
        hour, minute, second, hundreth: integer;
        end;

procedure GetTime (var time: time_def);
procedure TimeDiff (var t1, t2, d: time_def);
procedure TimeAdd (var t1, d: time_def);
procedure TimeStr (var time: time_def;
                   var strg: str12;
                   hun: boolean);
procedure GetDate (var date: date_def);
procedure DateStr (var date: date_def;
                   var strg: str12);
function DayOfWeek (d: date_def): integer;
procedure day_name (day: byte; var s: str12);
procedure short_day_name (day: byte; var s: str12);
function Julian (d: date_def): real;
procedure JulToYMD (j: real;
                    var d: date_def);

IMPLEMENTATION procedure GetTime {var time: time_def};
{****************************************************************}
{* GetTime: Get the time from MSDOS.
{****************************************************************}
var reg: registers;
begin
  reg.ax := $2c00;
  msdos (reg);
  with time do begin
     hour := hi (reg.cx);
     minute := lo (reg.cx);
     second := hi (reg.dx);
     hundreth := lo (reg.dx);
     end;
end;

procedure TimeAdd {var t1, d: time_def};
{****************************************************************}
{* TimeDiff: add d to t1;
{****************************************************************}
var t: time_def;
begin
  t := t1;
  inc (t.hundreth, d.hundreth);
  if t.hundreth > 99 then begin
     dec (t.hundreth, 100);
     inc (t.second, 1);
     end;
  inc (t.second, d.second);
  if t.second > 59 then begin
     dec (t.second, 60);
     inc (t.minute, 1);
     end;
```

```
      inc (t.minute, d.minute);
      if t.minute > 59 then begin
         dec (t.minute, 60);
         inc (t.hour, 1);
         end;
      inc (t.hour, d.hour);
      t1 := t;
end;

procedure TimeDiff (var t1, t2, d: time_def);
{***************************************************************}
{* TimeDiff: calc the difference between t1 and t2. t1 should be
{*           earlier than t2.
{***************************************************************}
begin
   with d do begin
      hundreth := t2.hundreth - t1.hundreth;
      second := t2.second - t1.second;
      minute := t2.minute - t1.minute;
      hour := t2.hour - t1.hour;

if hundreth < 0 then begin
         hundreth := hundreth + 100;
         second := second - 1;
         end;
      if second < 0 then begin
         second := second + 60;
         minute := minute - 1;
         end;
      if minute < 0 then begin
         minute := minute + 60;
         hour := hour - 1;
         end;
      if hour < 0 then hour := hour + 24;
      end;
end;

procedure TimeStr (var time: time_def;
                   var strg: str12;
                   hun: boolean);
{***************************************************************}
{* TimeStr: format the time into a string. Hun adds hundredths of seconds.
{***************************************************************}
var s1, s2, s3: string[2];
    i: integer;
begin
   with time do begin
      str (hour:2, s1);
      str (minute:2, s2);
      str (second:2, s3);
      strg := s1 + ':' + s2 + ':' + s3;
      if hun then begin
         str (hundreth:2, s1);
         strg := strg + '.' + s1;
         end;
      for i := 1 to length (strg) do
         if strg[i] = ' ' then strg[i] := '0';
      end;
end;

procedure GetDate (var date: date_def);
{***************************************************************}
{* GetDate: get the date from MSDOS
{***************************************************************}
var reg: registers;
begin
   reg.ax := $2a00;
   msdos (reg);
   with date do begin
      year := reg.cx - 1900;
      if year > 99 then year := year - 100;
      month := hi(reg.dx);
      day := lo(reg.dx);
      end;
end;
```

```pascal
procedure DateStr {var date: date_def;
                   var strg: str12};
{****************************************************}
{* DateStr: format the date into a string.
{****************************************************}
var s1, s2, s3: string[2];
    i: integer;
begin
  with date do begin
     str (month:2, s1);
     str (day:2, s2);
     str (year:2, s3);
     strg := s1 + '/' + s2 + '/' + s3;
     for i := 1 to length (strg) do
        if strg[i] = ' ' then strg[i] := '0';
     end;
end;

function DayOfWeek {d: date_def}: integer};
{****************************************************}
{* DayOfWeek: return the day of the week for the passed date.
{*            Day range is 1-7 for sun-sat.
{****************************************************}
var cent, yr: byte;
temp: integer;
begin
  with d do begin
     if year < 100 then year := year + 1900;
     month := month - 2;
     if (month < 1) or (month > 10) then begin
        month := month + 12;
        year := year - 1;
        end;
     cent := year div 100;
     yr := year mod 100;
     temp := (trunc (int (2.6 * month - 0.2)) + day + yr + (yr div 4)
              + (cent div 4) - cent - cent) mod 7;
     if temp < 0 then temp := temp + 7;
     DayOfWeek := temp + 1;
     end; {with}
end;

procedure day_name {day: byte; var s: str12};
{****************************************************}
{* day_name: get the name of a day
{****************************************************}
begin
  case day of
     1: s := 'Sunday   ';
     2: s := 'Monday   ';
     3: s := 'Tuesday  ';
     4: s := 'Wednesday';
     5: s := 'Thursday ';
     6: s := 'Friday   ';
     7: s := 'Saturday ';
     end;
end;

procedure short_day_name {day: byte; var s: str12};
{****************************************************}
{* day_name: get the short name of a day
{****************************************************}
begin
  case day of
     1: s := 'Sun';
     2: s := 'Mon';
     3: s := 'Tue';
     4: s := 'Wed';
     5: s := 'Thu';
     6: s := 'Fri';
     7: s := 'Sat';
     end;
end;
```

```
function Julian (d: date_def): real};
{*****************************************************************}
{* Julian: calculate the Julian day number for the given date. Expects
{*          year values less than 100.
{*****************************************************************}
var temp: real;
begin
  with d do begin
    if year < 3 then begin
      writeln;
      writeln ('Year 2000 hit in proceudre Julian');
      halt;
    end;
    if year < 100 then year := year + 1900;
    temp := int ((month - 14.0) / 12.0);
    julian := day - 32075.0 +
              int (1461.0 * (year + 4800.0 + temp) / 4.0) +
              int (367.0 * (month - 2.0 - temp * 12.0) / 12.0) -
              int (3.0 * int ((year + 4900.0 + temp) / 100.0) / 4.0);
  end;
end;

procedure JulToYMD (j: real;
                    var d: date_def);
{*****************************************************************}
{* JulToYMD: convert from Julian to YMD. Returns year values with
{*           1900 subtracted.
{*****************************************************************}
var r1, r2: real;
begin
  with d do begin
    r1 := j + 68569.0;
    r2 := int (4.0 * r1 / 146097.0);
    r1 := r1 - int ((146097.0 * r2 + 3.0) / 4.0);
    year := trunc (4000.0 * (r1 + 1.0) / 1461001.0);
    r1 := r1 - int (1461.0 * year / 4.0) + 31.0;
    month := trunc (80.0 * r1 / 2447.0);
    day := trunc (r1 - int (2447.0 * month / 80.0));
    r1 := int (month / 11.0);
    month := trunc (month + 2.0 - 12.0 * r1);
    year := trunc (100.0 * (r2 - 49.0) + year + r1);
    year := year - 1900;
  end; {with}
end;

begin
end.
```

What is claimed is:

1. A computer implemented method of scheduling tasks each of which has associated hard and soft constraints, said method comprising:
   generating an initial population of sequential task lists;
   sequentially fitting the tasks in each list in the then existing population in order into a respective possible schedule observing associated hard constraints thereby to deterministically generate a set of schedules;
   evaluating each possible schedule so generated as a function of the associated soft constraints to obtain a ranking of the respective lists;
   repetitively applying to the then existing population a genetic algorithm which effects recombination and mutation to members of the population stochastically chosen on the basis of the ranking of the corresponding schedules, thereby to modify the population; and
   outputting the schedules generated by the last population, together with their rankings.

2. A computer implemented method of scheduling tasks each of which has associated hard and soft constraints, said method comprising:
   generating an initial population of sequential task lists;
   sequentially fitting the tasks in each list in the then existing population in order into a respective possible schedule observing associated hard constraints thereby to deterministically generate a set of schedules;
   evaluating each possible schedule so generated as a function of the associated soft constraints to obtain a ranking of the respective lists;
   repetitively performing the steps of:
     selecting a pair of higher ranking lists for combination;
     imposing characteristics from one of the lists in each selected pair onto corresponding portions of a copy of the other list in the respective pair, the non-corresponding portions of said copy being shifted to accommodate the imposed portions so that the list remains complete and adding the thereby modified copy to the then existing population as a new member;

sequentially fitting the tasks in each new member list in order into a respective schedule observing associated hard constraints and evaluating each schedule so generated to obtain a new ranking of the population;

deleting a lower ranked list from the then existing population; and outputting the schedules generated by the last population, together with their rankings.

3. The method as set forth in claim 2 wherein said imposing of characteristics is performed by randomly selecting list positions and imposing the corresponding tasks from one of the lists in the pair which occur at those positions onto the corresponding positions in the other list of the pair.

4. The method as set forth in claim 2 wherein said imposing of characteristics is performed by randomly selecting list positions and imposing the order of the tasks from one of the lists in the pair which occur at those positions onto the corresponding tasks in the other list of the pair.

5. The method as set forth in claim 2 further comprising:

at intervals, selecting one of the task lists in the existing population and mutating the positions of tasks in that list.

6. The method as set forth in claim 5 wherein said mutation is performed by randomly selecting a pair of tasks in the selected list and reversing the positions of the selected tasks.

7. The method as set forth in claim 2 wherein said modified copy is added to the population only if it does not duplicate an existing member of the population.

8. A computer implemented method of scheduling tasks each of which require selected resources from a predetermined pool of resources for respective time intervals and each of which has associated constraints and an associated scoring function for evaluating its inclusion within a schedule, said method comprising:

generating an initial random population of sequential task lists;

sequentially fitting the tasks in each list in the existing population in order into a respective possible schedule observing said associated constraints thereby to deterministically generate a set of schedules;

evaluating each possible schedule in accordance with said scoring functions to obtain a ranking of the respective lists;

repetitively performing the steps of:
stochastically selecting a pair of higher ranking lists for combination;
randomly selecting tasks from one of the lists in each selected pair and imposing the list positions of those selected tasks on the corresponding tasks in a copy of the other list in the respective pair, the non-corresponding tasks in said copy being shifted in list position to accommodate the imposed positions so that the list remains complete and adding the thereby modified copy to the existing population as a new member; and
sequentially fitting the tasks in each new member list into a respective schedule observing associated constraints thereby to deterministically generate a set of schedules and evaluating each schedule so generated to obtain a new ranking of the then existing population; and
stochastically deleting a lower ranked list from the then existing population;

at intervals, stochastically selecting a pair of tasks in one of the task lists in the existing population and reversing the positions of the selected tasks in that list; and outputting the schedules generated by the last population, together with their rankings.

9. The method as set forth in claim 8 further comprising:

at intervals, selecting one of the task lists in the existing population and mutating the positions of tasks in that list.

10. A computer implemented method of assigning resources to service tasks each of which require selected resources for respective time intervals, there being associated hard constraints which must be observed and associated soft constraints for evaluating a schedule, said method comprising:

generating an initial random population of sequential lists of items which may comprise tasks or resources;

deterministically fitting the sequential member items in each list in the existing population in order into a respective possible schedule observing said associated hard constraints thereby to deterministically generate a set of schedules;

evaluating each possible schedule in accordance with said soft constraints to obtain a ranking of the respective lists;

repetitively performing the steps of:
stochastically selecting a pair of higher ranking lists for combination;
imposing characteristics from one of the lists in each selected pair onto corresponding portions of a copy of the other list in the respective pair, the non-corresponding portions of said copy being shifted in to accommodate the imposed portions and adding the thereby modified copy to the existing population as a new member;
deterministically fitting the items in each new member list into a respective schedule observing hard constraints and evaluating each schedule so generated to obtain a new ranking of the population; and
stochastically deleting a lower ranked list from the existing population;

at intervals, selecting a pair of tasks in one of the task lists in the existing population and mutating the positions of tasks in that list; and outputting the schedules generated by the last population, together with their rankings.

11. The method as set forth in claim 9 wherein said imposing of characteristics is performed by randomly selecting list positions and imposing the corresponding items from one of the lists in the pair onto the corresponding positions in the other list of the pair and wherein said mutation is performed by reversing the positions of a randomly selected pair of items in the selected list.

12. The computer implemented method of assigning resources to service tasks each of which require selected resources for respective time intervals, there being associated hard constraints which must be observed and associated soft constraints for evaluating a schedule, said method comprising:

generating an initial random population of sequential lists of items which may comprise tasks or resources;

deterministically fitting the sequential member items in each list in the existing population in order into a respective possible schedule observing said associated hard constraints thereby to deterministically generate a set of schedules;

evaluating each possible schedule in accordance with said soft constraints to obtain a ranking of the respective lists;

repetitively applying to the then existing population a genetic algorithm which effects recombination and mutation to members of the population stochastically chosen on the basis of the ranking of the corresponding schedules thereby to modify the population; and outputting the schedules generated by the last population, together with their rankings.

13. A computer implemented schedule generating system which operates on a population of lists of tasks each of which has associated hard and soft constraints, said system comprising:

a schedule builder which operates on each list in an existing population to deterministically create a possible schedule which observes associated hard constraints;

a schedule evaluator which scores each possible schedule generated as a function of associated soft constraints; and a genetic algorithm which operates to repetitively;

stochastically select a pair of higher ranking lists from the then existing population for combination;

randomly select tasks from one of the lists in each selected pair and imposing the list positions of those selected tasks on the corresponding tasks in a copy of the other list in the respective pair, the non-corresponding tasks in said copy being shifted in list position to accommodate the imposed positions so that the list remains complete;

adding the thereby modified copy to the existing population with the list being submitted to the schedule builder and schedule evaluator so as to obtain a new ranking of the population;

stochastically deleting a lower ranked list from the existing population; and at intervals, randomly selecting a pair of tasks in one of the task lists in the existing population and reversing the positions of the selected tasks in that list; and outputting the schedules generated by the last population, together with their rankings.

14. The schedule generating system as set forth in claim 13 wherein the copy is added to the population only if it does not duplicate an existing member of the population.

* * * * *